(12) United States Patent
Kim et al.

(10) Patent No.: US 7,535,469 B2
(45) Date of Patent: May 19, 2009

(54) APPARATUS AND METHOD FOR CREATING THREE-DIMENSIONAL CARICATURE

(75) Inventors: Jay Woo Kim, Yongin (KR); Dong Kwan Kim, Suwon (KR); Jun Ho Park, Suwon (KR); Eui Hyeon Hwang, Bucheon (KR); Dong Ryeol Park, Yongin (KR)

(73) Assignee: Samsung Electronics Co., Ltd., Suwon, Kyungki-Do (KR)

( * ) Notice: Subject to any disclaimer, the term of this patent is extended or adjusted under 35 U.S.C. 154(b) by 177 days.

(21) Appl. No.: 10/428,818

(22) Filed: May 5, 2003

(65) Prior Publication Data

US 2003/0206171 A1 Nov. 6, 2003

(30) Foreign Application Priority Data

May 3, 2002 (KR) .................... 10-2002-0024425
Oct. 9, 2002 (KR) .................... 10-2002-0061583

(51) Int. Cl.
G06T 15/00 (2006.01)
G06T 17/00 (2006.01)
G06T 11/20 (2006.01)
G06K 9/46 (2006.01)
G06K 9/66 (2006.01)
G09G 5/00 (2006.01)

(52) U.S. Cl. ................ 345/419; 345/420; 345/441; 345/646; 382/190; 382/195

(58) Field of Classification Search .......... 345/419, 345/441, 582, 646, 647, 473, 420, 423; 382/154, 382/103, 115, 117, 118, 190, 195

See application file for complete search history.

(56) References Cited

U.S. PATENT DOCUMENTS 4,276,570 A * 6/1981 Burson et al. ............ 382/276

(Continued)

FOREIGN PATENT DOCUMENTS

EP         505142 A2 * 12/1994

(Continued)

OTHER PUBLICATIONS

Cootes, T.F.; Taylor, C.J.; Lanitis, A.; "Multi-resolution search with active shape models", Proceedings of 12th IAPR International Conference on Pattern Recognition, vol. 1—Conference A: Computer Vision & Image Processing, Oct. 9-13, 1994, pp. 610-612.*

(Continued)

*Primary Examiner*—Ulka Chauhan
*Assistant Examiner*—Roberta Prendergast
(74) *Attorney, Agent, or Firm*—Buchanan Ingersoll & Rooney PC

(57) ABSTRACT

The present invention relates to an apparatus and method for creating a three-dimensional caricature, and more particularly, to an apparatus and method for creating a three-dimensional caricature having a high degree of similarity to user's face by precisely extracting feature point information on facial features and modifying a three-dimensional polygon face basic model based on the feature point information using an ASM technique specialized for faces. The method comprises the steps of detecting the positions of eyes from an input facial image and normalizing the size of the facial image, detecting each initial position for facial features from the normalized facial image, loading ASMs in the normalized facial image so as to correspond to the detected initial position and then extracting feature points for the facial features, and creating a three-dimensional polygon face caricature by modifying the three-dimensional polygon face basic model according to coordinate values of the extracted feature points.

39 Claims, 14 Drawing Sheets

U.S. PATENT DOCUMENTS

| | | | | |
|---|---|---|---|---|
| 4,389,677 | A | * | 6/1983 | Rushby et al. ............... 358/463 |
| 5,608,839 | A | * | 3/1997 | Chen .......................... 704/235 |
| 5,774,129 | A | * | 6/1998 | Poggio et al. ................ 345/441 |
| 5,844,573 | A | * | 12/1998 | Poggio et al. ................ 345/441 |
| 5,917,943 | A | * | 6/1999 | Washizawa .................. 382/190 |
| 5,933,527 | A | * | 8/1999 | Ishikawa ..................... 382/190 |
| 5,960,099 | A | * | 9/1999 | Hayes et al. ................. 382/118 |
| 5,990,901 | A | * | 11/1999 | Lawton et al. ............... 345/581 |
| 6,031,539 | A | * | 2/2000 | Kang et al. .................. 345/419 |
| 6,064,768 | A | * | 5/2000 | Hajj et al. .................... 382/195 |
| 6,094,508 | A | * | 7/2000 | Acharya et al. ............. 382/199 |
| 6,163,619 | A | * | 12/2000 | Maruo ......................... 382/141 |
| 6,181,806 | B1 | * | 1/2001 | Kado et al. .................. 382/118 |
| 6,188,776 | B1 | * | 2/2001 | Covell et al. ................ 382/100 |
| 6,192,150 | B1 | * | 2/2001 | Leow et al. .................. 382/190 |
| 6,208,356 | B1 | * | 3/2001 | Breen et al. .................. 345/473 |
| 6,226,015 | B1 | * | 5/2001 | Danneels et al. ............. 345/473 |
| 6,278,460 | B1 | * | 8/2001 | Myers et al. ................. 345/424 |
| 6,283,858 | B1 | * | 9/2001 | Hayes et al. ................... 463/31 |
| 6,304,264 | B1 | * | 10/2001 | Chen et al. ................... 345/419 |
| 6,476,803 | B1 | * | 11/2002 | Zhang et al. ................. 345/419 |
| 6,532,011 | B1 | * | 3/2003 | Francini et al. .............. 345/420 |
| 6,545,673 | B1 | * | 4/2003 | Shiitani et al. ............... 345/418 |
| 6,580,821 | B1 | * | 6/2003 | Roy ............................. 382/154 |
| 6,912,293 | B1 | * | 6/2005 | Korobkin ..................... 382/100 |
| 7,095,878 | B1 | * | 8/2006 | Taylor et al. ................. 382/118 |
| 7,123,262 | B2 | * | 10/2006 | Francini et al. .............. 345/473 |
| 2002/0018595 | A1 | * | 2/2002 | Kwak ........................... 382/203 |
| 2003/0146918 | A1 | * | 8/2003 | Wiles et al. .................. 345/582 |
| 2004/0170323 | A1 | * | 9/2004 | Cootes et al. ................ 382/199 |
| 2005/0027492 | A1 | * | 2/2005 | Taylor et al. .................... 703/2 |

FOREIGN PATENT DOCUMENTS

| | | | | |
|---|---|---|---|---|
| JP | 8194839 | | | 7/1996 |
| JP | 09097354 | A | * | 4/1997 |
| JP | 2002063585 | | | 2/2002 |
| KR | 2000-0049421 | A | | 8/2000 |
| KR | 2000-0063391 | A | | 11/2000 |
| KR | 2000-0064110 | A | | 11/2000 |
| KR | 2001-0069820 | A | | 7/2001 |
| KR | 2002014298 | A | * | 2/2002 |

OTHER PUBLICATIONS

Cootes, T.F.; Taylor, C.J.; "Using grey-level models to improve active shape model search", Proceedings of the 12th IAPR International Conference on Pattern Recognition, vol. 1—Conference A: Computer Vision & Image Processing, Oct. 9-13, 1994, pp. 63-67.*

Cootes, T.F.; Walker, K.; Taylor, C.J.; "View-based active appearance models", Proceedings of 4th IEEE International Conference on Automatic Face and Gesture Recognition, Mar. 28-30, 2000, pp. 227-232.*

Edwards, G.J.; Taylor, C.J.; Cootes, T.F.; "Interpreting face images using active appearance models", Proceedings of 3rd IEEE International Conference on Automatic Face and Gesture Recognition, Apr. 14-16, 1998, pp. 300-305.*

Froba, B. et al., "Real-time active shape models for face segmentation", Proceedings of 2001 International Conference on Image Processing, vol. 1, Oct. 7-10, 2001, pp. 205-208.*

Hao Wang; Kongqiao Wang; "Facial feature extraction and image-based face drawing", 6th International Conference on Signal Processing, vol. 1, Aug. 26-30, 2002, pp. 699-702.*

Hutton, T.J.; Buxton, B.R.; Hammond, P.; "Dense surface point distribution models of the human face", IEEE Workshop on Mathematical Methods in Biomedical Image Analysis (MMBIA 2001), Dec. 9-10, 2001, pp. 153-160.*

Kap-Ho Seo; Won Kim; Changmok Oh; Ju-Jang Lee; "Face detection and facial feature extraction using color snake", Proceedings of 2002 IEEE International Symposium on Industrial Electronics (ISIE 2002), vol. 2, Jul. 8-11, 2002, pp. 457-462.*

Lanitis, A.; Taylor, C.J.; Cootes, T.F.; "Automatic interpretation and coding of face images using flexible models", IEEE Transactions on Pattern Analysis and Machine Intelligence, vol. 19, Issue 7, Jul. 1997, pp. 743-756.*

Lanitis, A.; Taylor, C.J.; Cootes, T.F.; "Automatic tracking, coding and reconstruction of human faces, using flexible appearance models", Electronics Letters, vol. 30, Issue 19, Sep. 15, 1994, pp. 1587-1588.*

Li Yong et al., "Face contour extraction with active shape models embedded knowledge", Proceedings of WCCC-ICSP 2000 5th International Conference on Signal Processing, vol. 2, Aug. 21-25, 2000, pp. 1347-1350.*

Sum, K.L. et al., "A new optimization procedure for extracting the point-based lip contour using active shape model", Proceedings of 2001 IEEE International Conference on Acoustics, Speech, and Signal Processing, (ICASSP '01), vol. 3, May 7-11, 2001, pp. 1485-1488.*

Walker, K.N.; Cootes, T.F.; Taylor, C.J.; "Determining correspondences for statistical models of facial appearance", Proceedings of 4th IEEE International Conference on Automatic Face and Gesture Recognition, Mar. 28-30, 2000, pp. 271-276.*

Yuanzhong Li; Kobatake, H.; "Extraction of facial sketch images and expression transformation based on FACS", Proceedings of International Conference on Image Processing, vol. 3, Oct. 23-26, 1995, pp. 520-523.*

Hotta, K.; Mishima, T.; Kurita, T.; Umeyama, S.; "Face matching through information theoretical attention points and its applications to face detection and classification", Proceedings of 4th IEEE International Conference on Automatic Face and Gesture Recognition, Mar. 28-30, 2000, pp. 34-39.*

Ki-Chung Chung; Seok Cheol Kee; Sang Ryong Kim; "Face recognition using principal component analysis of Gabor filter responses", Proceedings of International Workshop on Recognition, Analysis, and Tracking of Faces and Gestures in Real-Time Systems, Sep. 26-27, 1999, pp. 53-57.*

Lee, R.S.T.; Liu, J.N.K.; "An integrated elastic contour fitting and attribute graph matching model for automatic face coding and recognition", Third International Conference Knowledge-Based Intelligent Information Engineering Systems, Aug. 31-Sep. 1, 1999, pp. 292-295.*

Lyons, M.; Akamatsu, S.; Kamachi, M.; Gyoba, J.; "Coding facial expressions with Gabor wavelets", Proceedings of 3rd IEEE International Conference on Automatic Face and Gesture Recognition, Apr. 14-16, 1998, pp. 200-205.*

Yingjie Wang; Chin-Seng Chua; Yeong-Khing Ho; Ying Ren; "Integrated 2D and 3D images for face recognition", Proceedings of 11th International Conference on Image Analysis and Processing, Sep. 26-28, 2001, pp. 48-53.*

Ying-li Tian; Kanade, T.; Cohn, J.F.; "Evaluation of Gabor-wavelet-based facial action unit recognition in image sequences of increasing complexity", Proceedings of 5th IEEE International Conference on Automatic Face and Gesture Recognition, May 20-21, 2002, pp. 218-223.*

Dornaika, F.; Ahlberg, J.; "Face model adaptation using robust matching and active appearance models", Proceedings Sixth IEEE Workshop on Applications of Computer Vision, 2002. (WACV 2002), Dec. 3-4, 2002, pp. 3-7.*

Fujiwara, et al.; "On the detection of feature points of 3D facial image and its application to 3D facial caricature", Proceedings Second International Conference on 3-D Digital Imaging and Modeling, Oct. 4-8, 1999, pp. 490-496.*

Fujiwara, et al.; "3D modeling system of human face and full 3D facial caricaturing", Proceedings Third International Conference on 3-D Digital Imaging and Modeling, May 28-Jun. 1, 2001, pp. 385-392.*

Fujiwara, et al.; "3D modeling system of human face and full 3D facial caricaturing", Proceedings Seventh International Conference on Virtual Systems and Multimedia, Oct. 25-27, 2001, pp. 625-633.*

Fujiwara, et al.; "A method for 3D face modeling and caricatured figure generation", Proceedings 2002 IEEE International Conference on Multimedia and Expo, ICME '02, vol. 2, Aug. 26-29, 2002, pp. 137-140.*

Lin Liang et al.; "Example-based caricature generation with exaggeration", Proceedings 10th Pacific Conference on Computer Graphics and Applications, Oct. 9-11, 2002, pp. 386-393.*

Pujol, A.; Villanueva, J.J.; Wechsler, H.; "Automatic view based caricaturing", Proceedings 15th International Conference on Pattern Recognition, vol. 1, Sep. 3-7, 2000, pp. 1072-1075.*

Tiddeman, B.; Rabey, G.; Duffy, N.; "Synthesis and transformation of three-dimensional facial images", IEEE Engineering in Medicine and Biology Magazine, vol. 18, Issue 6, Nov.-Dec. 1999, pp. 64-69.*

Korean Office Action (with English translation), dated Apr. 22, 2004.

Office Action issued by Japanese Patent Office on Jun. 7, 2006.

* cited by examiner (a) (b)

(a) Facial image  (b) Threshold=50  (c) Threshold=100  (d) Threshold=150  (e) Threshold=200

(a)      (b)      (c)      (d)

(e)      (f)      (g)

Facial image    ASM loading    ASM adaptation (10 times)    ASM adaptation (20 times)

(a)

Facial image    ASM loading    ASM adaptation (10 times)

(b)

(a)

(b)

APPARATUS AND METHOD FOR CREATING THREE-DIMENSIONAL CARICATURE

This application claims priority under 35 U.S.C. §§119(a)-(d) to Korean application number 10-2002-0024425, filed May 3, 2002 and Korean application number 10-2002-0061583, filed Oct. 9, 2002.

BACKGROUND OF THE INVENTION

1. Field of the Invention

The present invention relates generally to an apparatus and method for creating a three-dimensional caricature, and more particularly to an apparatus and method for creating a three-dimensional caricature having a high degree of similarity to user's face by precisely extracting feature point information on facial features and modifying a three-dimensional polygon face basic model based on the feature point information through the use of an Active Shape Model (ASM) technique specialized for faces.

2. Description of the Prior Art

Typically, a caricature means a drawing intended to give an effect of comicality, humor, satire, etc., with such materials as persons or personified animals and plants, including such senses as a user's curiosity, an indirect satisfaction, an ideal person imagined by an individual, etc. Although caricatures have mainly been utilized as advertising measures by entertainers or sportsmen, presently it is being widely used by the general public.

In addition, although caricatures have traditionally been created manually through work by a specialized caricature designer, techniques capable of creating caricatures without any aid of the specialized caricature designer have been developed as the general public interest in caricatures has increased.

As one example of these techniques, there is a method in which a user selects and combines clip art samples required to form facial contours of an eye, nose, mouth, etc., from a clip art database, and adds various accessories, clothes, etc. for creating a final caricature. However, this method evokes great discontent due to lack of similarity derived from great difficulty of selection of clip art samples closely resembling the user's own facial features.

The Korean Patent Laid-Open Publication No. 2000-63391 (entitled "Caricature Creation Method") discloses a method of creating a caricature, in which an entire facial shape is first completed from a face in photograph, then the position, ratio and kind of each facial feature to be applied to the facial shape are calculated, and finally models for facial features are extracted from a database previously constructed for each facial feature of various sizes and then these models are combined together. However, in this method, it is almost impossible to extract precise feature points for facial features since only information on the position of each facial feature with respect to the size of a face is used. Therefore, this makes it difficult to create a caricature closely resembling the user's own facial features.

Further, The Korean Patent Laid-Open Publication No. 2000-49421 (entitled "Caricature Creation System and Caricature Creation Method Using the System") discloses a method in which each part in a photograph edited through software is compared to a caricature for each part of a face, then each part of the face requiring modification is replaced with data stored in a database for completing a caricature for an entire face. However, this method is substantially limited by the impossibility of the creation of a caricature having colors because of a requirement for the photograph editing process in which original data consisting of natural colors through a color tone conversion are separated into black and white.

In addition, the Korean Patent Laid-Open Publication No. 2000-64110 (entitled "Automatic Caricature Creation Apparatus and Method Based On a Facial Image") discloses a method in which information on the shape of face is extracted by using information on correspondence points of an input facial image with a reference image and then the facial image is synthesized again based on the extracted information for obtaining more natural and elaborate caricature images. However, this method takes a simple scheme that a prepared reference image is synthesized with a facial image, as in the Korean Patent Laid-Open Publication No. 2000-63391, and particularly lacks a definite explanation about the extraction of facial feature points from the facial image.

All the aforementioned disclosures are directed to two-dimensional caricature creation. On the other hand, studies for a three-dimensional caricature creation using face-modeling techniques are briskly progressing at present.

As one of techniques for three-dimensional caricature creation, U.S. Pat. No. 5,960,099 (entitled "System and Method for Creating a Digitized Likeness of Persons") discloses a technique in which facial features, i.e., positions of parts of a face, are estimated through statistical data by using two front and side facial shapes and a likeness of persons with its facial expression modified is created based on the estimations. However, this technique has a problem that the facial features of an original image cannot be correctly found since the estimation of the facial features depends on statistical data when the modified likeness of persons is created by using the two front and side facial shapes.

As another three-dimensional caricature creation technique, the Korean Patent Laid-Open Publication No. 2001-69820 (entitled "Method and System for Obtaining a Three-Dimensional Facial Image from a Two-Dimensional Facial Image") discloses a technique in which contours of an eye, nose, ear, eyebrow and face, a contour of a ridge of a nose, and special features of hair, etc. are extracted from front and side photographs, and then a plurality of three-dimensional facial shapes similar to the extracted facial features are selected from a three-dimensional facial shape database (accumulating a number of faces of actual persons) such that a user can select the most similar three-dimensional facial shape to his own facial photograph. However, since this technique obtains the most similar three-dimensional facial shape through a simple comparison with the pre-constructed facial shape database, it requires additional manual work by a retoucher for the correction of finer details.

SUMMARY OF THE INVENTION

Accordingly, the present invention has been made keeping in mind the above problems occurring in the prior art, and an object of the present invention is to provide an apparatus and method for creating a three-dimensional caricature having a high similarity to a user's face by precisely extracting feature point information on facial features and modifying a three-dimensional polygon face basic model based on feature point information, by using an ASM(Active Shape Model) technique specialized for faces.

In order to accomplish the above object, the present invention provides an apparatus for creating a three-dimensional caricature based on a user's input facial image, comprising a memory unit for storing ASMs required to create the three-dimensional caricature, and a three-dimensional polygon face basic model; a pre-processing unit for detecting positions of eyes from the input facial image and normalizing the size of the facial image; a facial feature initial position-detecting unit for detecting each initial position for facial features from the normalized facial image; an ASM loading unit for loading the ASMs stored in the memory unit in the normalized facial image so as to correspond to the detected initial position; an ASM adapting unit for adapting the loaded ASMs so as to extract feature points for the facial features; and a caricature-creating unit for creating a three-dimensional polygon face caricature by loading the three-dimensional polygon face basic model from the memory unit and then modifying the loaded three-dimensional polygon face basic model according to coordinate values of the feature points extracted through the ASM adapting unit.

Preferably, the apparatus further comprises a projecting unit for obtaining a two-dimensional face caricature by projecting the three-dimensional polygon face caricature onto a two-dimensional plane.

Preferably, the apparatus further comprises a caricature transmitting/receiving unit for transmitting/receiving coordinate values and memory reference values of the feature points extracted from the three-dimensional polygon face caricature.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE PREFERRED EMBODIMENTS

Hereinafter, the configuration and operation of a three-dimensional caricature creation apparatus according to the present invention will be described in detail with reference to the accompanying drawings.

Figure 1:
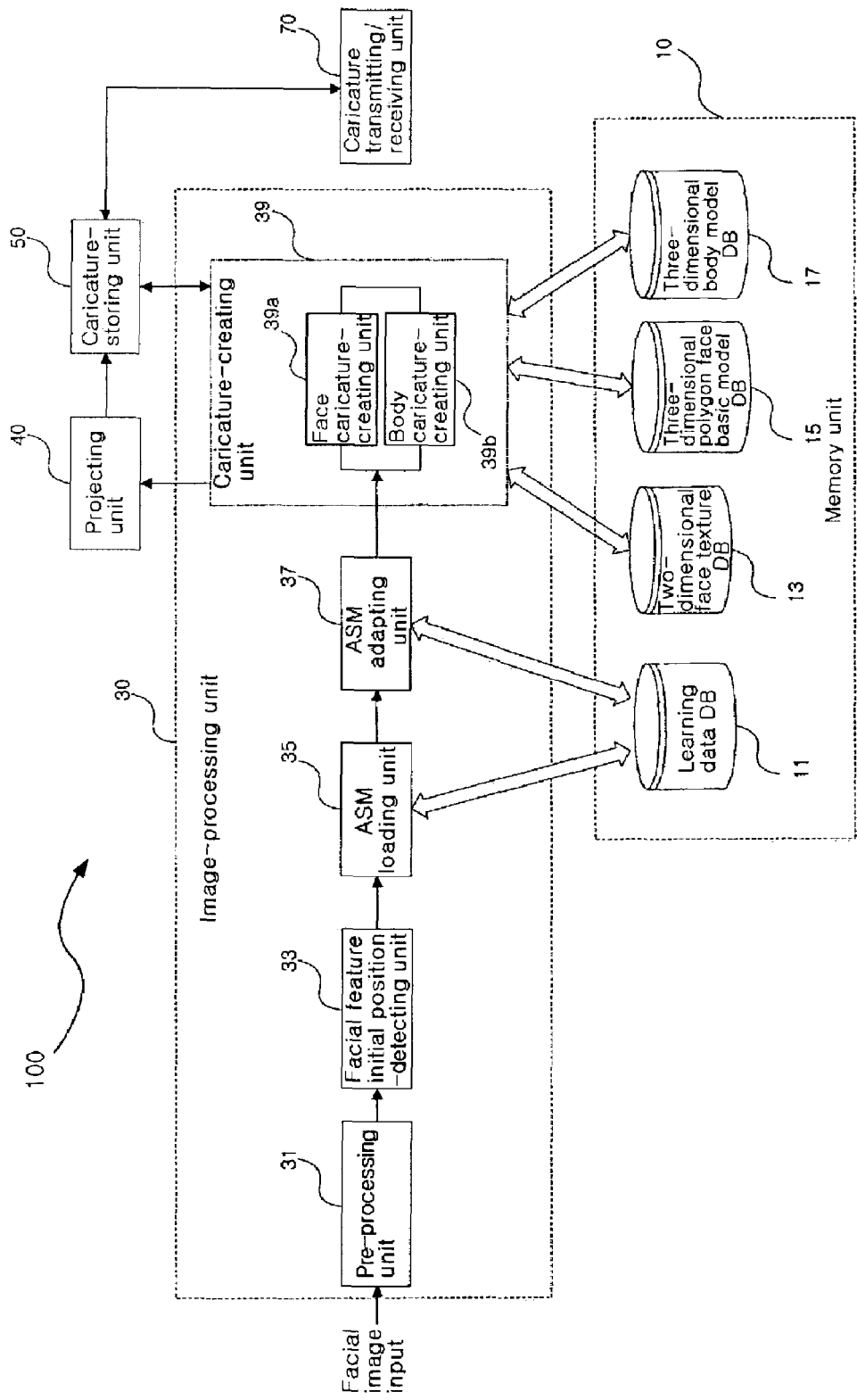
FIG. 1 is a schematic block diagram of a three-dimensional caricature creation apparatus according to the present invention.

FIG. 1 is a schematic block diagram of a three-dimensional caricature creation apparatus 100 according to the present invention, which includes a memory unit 10, an image-processing unit 30, a projecting unit 40, a caricature-storing unit 50, and a caricature transmitting/receiving unit 70.

The memory unit 10 stores learning data, a two-dimensional face texture, a three-dimensional polygon face basic model, a three-dimensional body model, etc., which are required to create a three-dimensional caricature, in the for of a database (hereinafter referred to as DB). The learning database DB 11, the two-dimensional face texture DB 13, the three-dimensional polygon face basic model DB 15, and the three-dimensional body model DB 17 will be briefly described.

The learning data DB 11 stores front/side ASMs obtained by using various shaped eyebrow, eye, nose, mouth, and face contours as learning patterns, and data on the average position coordinates of ASMs and shape variation characteristics of the ASMs. The two-dimensional face texture DB 13 stores two-dimensional face textures for texturing the three-dimensional polygon face basic caricature. Here, the two-dimensional face textures can be varied to make it possible to reflect a variety of color information in a three-dimensional face caricature. For example, the two-dimensional face textures are configured to make it possible to create more natural and elaborate caricatures by reflecting lip color in makeup, a variation of brightness of skin color due to illumination, etc. in the three-dimensional face caricature.

In addition, the three-dimensional polygon face basic model DB 15 stores various types of three-dimensional polygon face basic models, which are based on anthropological standard data reflected by racial/national traits. The three-dimensional body model DB 17 stores three-dimensional models for processing such body components as hair, body, glasses, accessories, clothes, and shoes with caricatures.

On the other hand, the memory unit 10 can include other data in addition to the learning data, the two-dimensional face texture, the three-dimensional polygon face basic model, and the three-dimensional body model.

The image-processing unit 30 plays a role in creating the three-dimensional caricature reflecting user's facial features by detecting feature point information on each part of a face and modifying the three-dimensional face basic model based on the detected feature point information by using the ASM technique. The image-processing unit 30 includes a pre-processing unit 31, a facial feature initial position-detecting unit 33, an ASM loading unit 35, an ASM adapting unit 37, and a caricature-creating unit 39.

The pre-processing unit 31 performs pre-processing for detecting positions of eyes in an input facial image and normalizing the size of a facial image. Hereinafter, the pre-processing unit 31 will be described in more detail with reference to FIG. 2.

Figure 2:
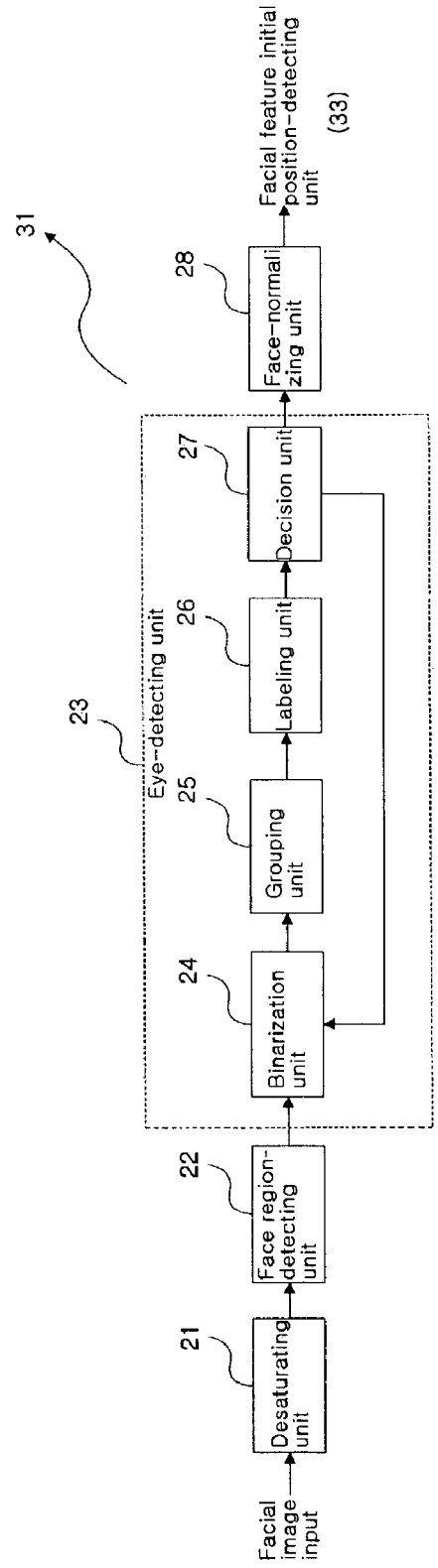
FIG. 2 is a detailed block diagram of a pre-processing unit shown in FIG. 1.

FIG. 2 is a detailed block diagram of a pre-processing unit shown in FIG. 1. As shown in FIG. 2, the pre-processing unit 31 includes a desaturating unit 21, a face region-detecting unit 22, an eye-detecting unit 23, and a face-normalizing unit 28.

The desaturating unit 21 converts a color image of an input facial image into a black and white image. The reason for such a conversion is to reduce the possibility of the occurrence of errors caused by a variation of brightness when feature points are extracted since color components and brightness components are mixed together in a color image of RGB (Red, Green, Blue) type.

The facial region-detecting unit 22 searches a facial region of an input image by using a Gabor Filter Response. The method for detecting a facial region by using the Gabor Filter Response is a method where a set of Gabor filters having various directionalities and frequencies is applied to an input facial image and then a facial region is extracted based on a response value produced by such an application. A more detailed explanation about this method will be omitted since it is a kind of a pre-processing method commonly used in the field of image processing.

The eye-detecting unit 23 detects circular black parts, i.e., the center points of eyes (pupils), in the centers of the whites of the eyes, which are positioned in the upper portion of the facial region, from the facial region detected through the facial region-detecting unit 22. Here, the reason for the earliest detection of the center points of eyes is that it is easiest to detect the center points of eyes, which are bilaterally symmetrical, and positions of other features can be easily detected by using an appropriate proportional relationship once the center points of eyes are positioned.

Figure 6:
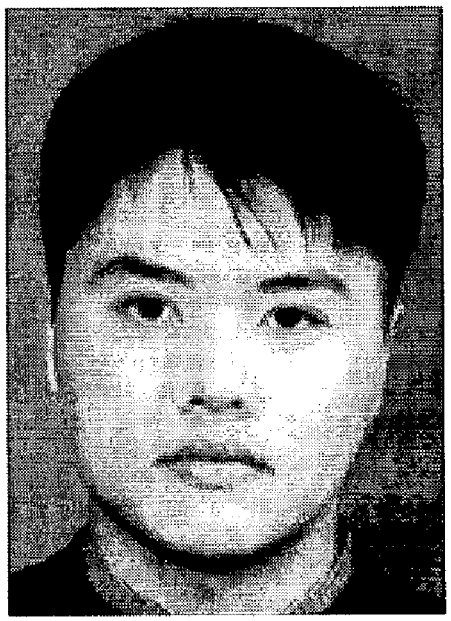
FIG. 6 is a view showing one example of a facial image.
Figure 6:
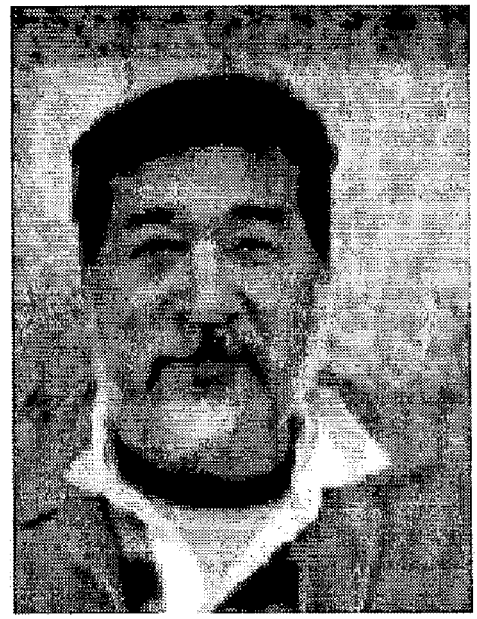

One example of a facial image input for creating a caricature is shown in FIG. 6. If a facial image having a high resolution as shown in FIG. 6 (a) is input, edges of eyes can be extracted and the center points of eyes can be detected based on the information on the extracted edges of the eyes. In contrast, if a facial image having a low resolution as shown in FIG. 6 (b) is input, the edges of eyes cannot be properly detected since the eyes are recognized as almost one point. Although the edges of eyes may be detected, there is a possibility that eyebrows are improperly recognized due to difficulty in discrimination between eyebrows and eyes. In addition to this edge detecting method, there is a binarization method where circular black regions are detected as the center points of eyes by using a fact that eye pupils are tinged with black due to their low brightness when a black and white facial image having brightness values of 256 steps on the basis of one threshold is divided into black and white. However, such a conventional binarization method using only one threshold has a limit that the center points of eyes cannot be correctly detected due to difficulty in the discrimination between eyebrows and eyes in a facial image having a low resolution and an irregular brightness distribution.

Therefore, the threshold should vary depending upon the condition of the facial image in order to correctly detect the positions of the eyes even in facial images having low resolution. The present invention performs a binarization operation while the threshold is increased until all of the eyebrows and the eyes appear to have specific black regions through the eye-detecting unit 23, which will be described in detail later. For this purpose, the eye-detecting unit 23 includes a binarization unit 24, a grouping unit 25, a labeling unit 26, and a decision unit 27.

The binarization unit 24 sets a range of threshold variation for binarization when a black and white facial image is input, sets an initial value for the threshold within the range of threshold variation, and then assigns white colors to pixels having brightness with a value above the threshold and black color to pixels having brightness value below the threshold on the basis of the initially set value of the threshold.

Figure 7:
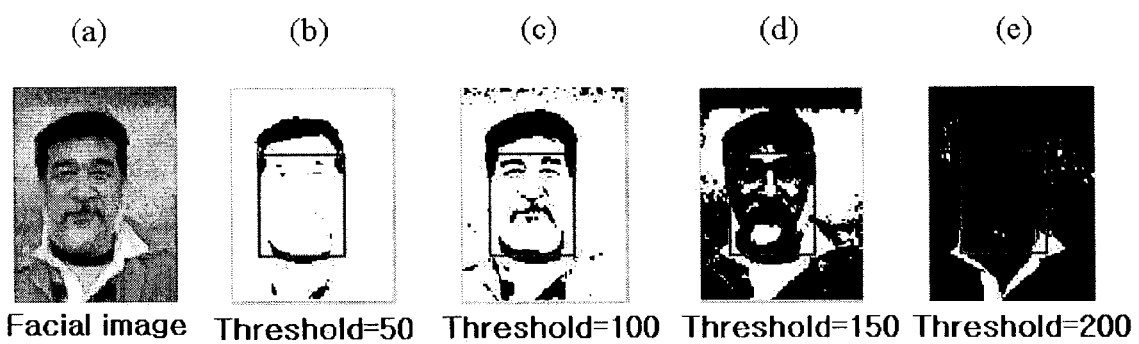
FIGS. 7 and 8 are views showing a result obtained by binarization of a facial image according to a preset threshold.
Figure 8:
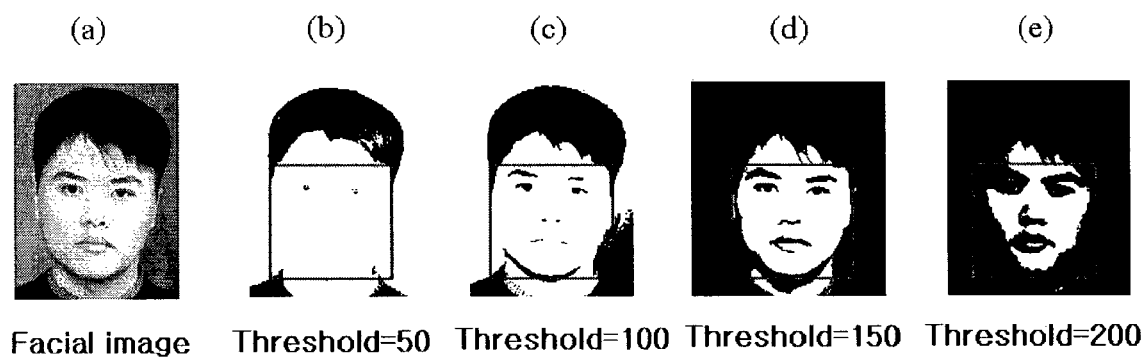

One example of a facial image that has undergone the binarization process according to the initially set value of the threshold is shown in FIGS. 7 and 8. As shown in FIGS. 7 and 8, when the facial image is binarized coding according to the initially set value, it can be seen that eyebrows are first detected and then eyes, nose, mouth, etc. appear to have a black color while the threshold is increased.

The grouping unit 25 performs grouping operations for tying pixels having a black color in regions corresponding to the eyebrows and the eyes into a plurality of groups when the binarized facial image is input. Here, "grouping" means that, after a specific black pixel is found, other black pixels are found by checking eight neighboring pixels around the specific black pixel and then the other black pixels found are tied into one group.

The labeling unit 26 sequences various groups detected through the grouping unit 25 by labeling them and then extracts regions having the same label for isolated regions.

Using the fact that eyebrows and eyes are always paired and the eyebrows are positioned above the eyes, the decision unit 27 checks for isolated regions positioned in an upper portion whether there are a pair of isolated regions having little size variation in a horizontal direction, and, if there are a pair of isolated regions, recognizes them as an eyebrow candidate region. Also, the decision unit 27 checks whether there are another pair of isolated regions having little size variation in a horizontal direction immediately below the eyebrow candidate region, and, if there are another pair of isolated regions, recognizes them as an eye candidate region.

If there are no pair of eyebrow candidate regions and no pair of eye candidate regions among the isolated regions extracted from the labeling unit 26, i.e., if neither two eyebrows nor two eyes are detected, the decision unit 27 performs the binarization with an increased threshold until two eyebrows and two eyes are detected such that the eyebrows are not wrongly recognized as the eyes.

If two eyebrows and two eyes are detected, the decision unit 27 calculates an error rate for the eye candidate region based on the information on size, shape and position of the eyes and decides whether the calculated error rate is within an allowable range in order to verify whether the eye candidate region corresponds to the eyes. If it is decided that the error rate for the eye candidate region is within the allowable range, i.e., that the eye candidate region corresponds to the eyes, the center point of each of two eyes is detected from the eye candidate region, which will be in detail described later with reference to FIG. 4.

The face-normalizing unit 28 normalizes the size of a facial region such that the facial region can be mapped in a one to one ratio with the three-dimensional face basic model stored in the three-dimensional polygon face basic model DB 15 based on the position of eyes detected by the eye-detecting unit 23, and, if the facial image is at a slight inclined angle, the inclined angle is corrected to be a normal angle.

Figure 10:
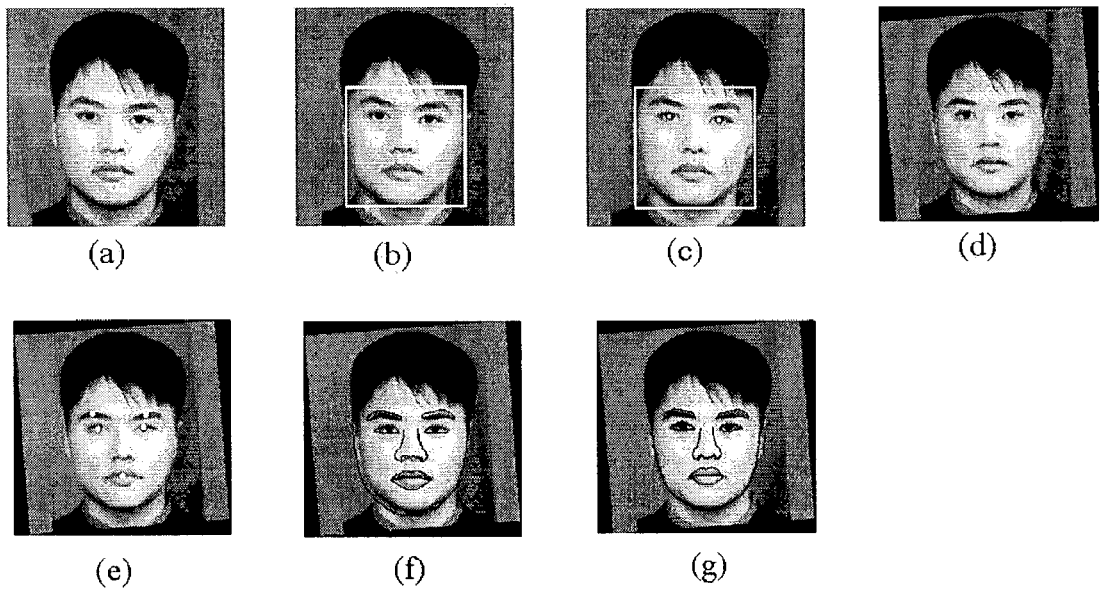
FIG. 10 is a view showing one example of the extraction of a feature point from an input facial image according to the present invention.

One example where the facial image is pre-processed through the pre-processing unit 31 is shown in FIGS. 10 (a) to (d). When the facial image is input, the pre-processing unit 31 removes effects caused by illumination and noise by converting the facial image into a black and white image as shown in FIG. 10 (a), and then detects a square facial region including features similar to the face by applying the Gabor filter to the original facial image as shown in FIG. 10 (b). Next, the pre-processing unit 31 detects the center points of two eyes from the facial region as shown in FIG. 10 (c), and then normalizes the size of the facial region and simultaneously corrects a possible inclination, based on the detected facial region and the center points of two eyes, as shown in FIG. 10 (d).

In the meantime, when feature points for each part of the face are extracted using a general ASM technique, eyebrows can be wrongly recognized as eyes or there can occur a phenomenon that each facial feature moves in an abnormal direction.

In order to avoid this phenomenon, the present invention presets rough positions of eyebrow, eye, nose, mouth or face contours by means of the facial feature initial position-detecting unit 33 before performing an ASM adaptation. Setting of the initial position of facial features will be described in more detail below.

When facial features are extracted from an input facial image, it is essential to select the positions on the facial region at which the ASM of each facial feature is placed for the ASM adaptation. In other words, the initial position in which the ASM is loaded has a significant effect on the ASM adaptation to be performed later. For example, if the initial position in which the ASM is loaded is set properly, the feature points can be correctly extracted only by a small number of the ASM adaptation processes, otherwise, the feature points may be wrongly extracted.

The facial feature initial position-detecting unit 33 detects the initial position of each facial feature by applying a Canny filter to the black and white facial image. Here, the Canny filter detects the initial position in which the ASM is to be loaded by detecting edges using Gaussian masks.

Also, in addition to the use of the Canny filter in detecting the initial positions of facial features, it is possible to detect the initial positions of eyebrows, eyes, nose and mouth by using geometrical positional relations between facial features based on the center points of two eyes detected through the eye-detecting unit 23.

One example where the initial position of each facial feature is detected from an input facial image and feature points are extracted by loading the ASM in the detected initial position is shown in FIGS. 10 (e) to (g). When initial positions of eyebrow, eye, nose, mouth or face contours are detected through the Canny filter as shown in FIG. 10 (e), feature points for facial features can be correctly extracted as shown in FIG. 10 (f) by loading the ASM in the detected initial positions and performing an adaptation of the loaded ASM as shown in FIG. 10 (g).

On the other hand, keeping a specific relation between ASMs for facial features serves to extract feature points correctly. For example, no matter how an adaptation of a right eye ASM is progressed, the midpoint of the right eye ASM should be present on the same horizontal axis as the left eye ASM, and accordingly if the relation that the right eye ASM should be always positioned below the right eyebrow ASM is established, ASM adaptation performance can be further improved.

Figure 11:
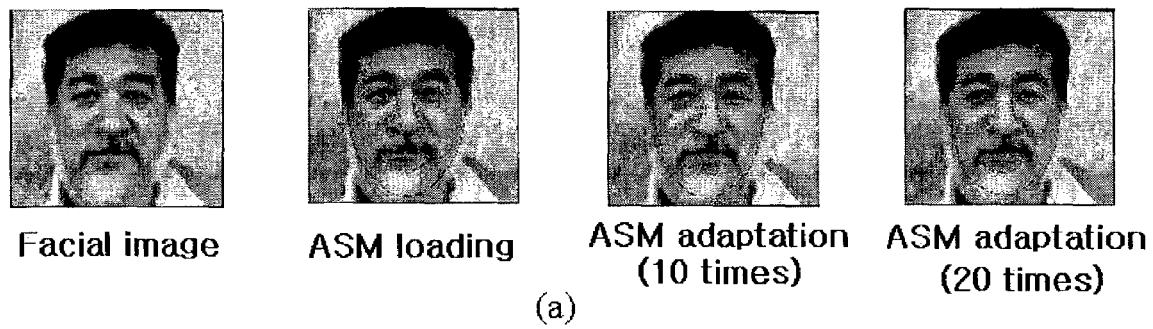
FIG. 11 is a view showing one example where an ASM adaptation performance is improved by an initial position detection of a facial feature.
Figure 11:
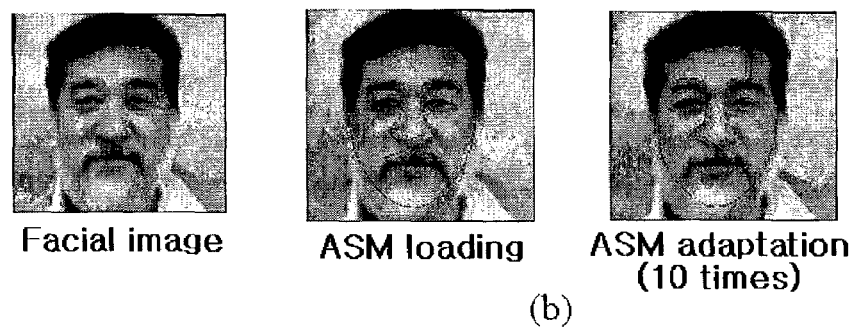

One example where the initial positions of the facial features are detected and the ASM adaptation performance is improved by limiting conditions of the relation between ASMs is shown in FIG. 11. As shown in FIG. 11 (a), if ASMs having no relation are loaded in an input facial image based on only the position of eyes, feature points may be wrongly extracted from the input facial image as ASM adaptation progresses. However, as shown in FIG. 11 (b), if the initial positions of facial features are set through the facial feature initial position-detecting unit 33 and then ASMs having an relation thereto are loaded into the facial image based on the set initial positions, it can be seen that the feature points are correctly extracted by only a small number of ASM adaptation processes.

In other words, when the initial positions of facial features are detected through the facial feature initial position-detecting unit 33, the ASM loading unit 35 can improve ASM adaptation performance by loading ASMs having a relation thereto from the learning data DB 11 in the facial image such that the ASMs correspond to the detected initial positions, and thus, the feature points for the facial features can be quickly and correctly extracted.

Particularly, in the present invention, since the learning data DB 11 stores ASMs learned with various resolutions to make it possible to cope with various resolution variations, even if a facial image having a low resolution is input from circumstances where it is difficult to provide a user interface capable of picking up a clear facial image, e.g., a portable phone carrying a miniature camera, feature points for eyebrow, eye, nose, mouth or face contours can be correctly extracted.

The ASM adapting unit 37 extracts feature points for input facial features by performing an adaptation of the loaded ASMs using data on shape variation characteristics of the ASM obtained in advance and then outputs X and Y coordinate values of the extracted feature points to the caricature-creating unit 39. Here, "ASM adaptation" means finding the feature points for eyebrow, eye, nose, mouth, or face contours by repeating a process to connect the feature points of the ASMs loaded in the facial image by a straight line, perform a search for pixels in a direction normal to the straight line at the midpoint of the straight line, use a pixel having a maximal correlation with a basic learning value in the search region as a new midpoint, and change the positions of feature points according to the new midpoint.

However, so far, there has been no basis for a method of setting the search region in the ASM adaptation. Accordingly, there is a great possibility that in the case of a too wide search region, feature points can be wrongly extracted, and in the case of a too narrow search region, the ASM adaptation requires too much time.

In addition, although most of the feature points were extracted within a desired region, the entire shape of the feature points may be wholly dispersed if one or two feature points are wrongly extracted. For example, since a portion occupied by the rounded sides of the nose and a portion recessed in the center of the upper lip are similar to each other in their shapes and positions, the former portion can be mistaken for the latter if the search region of feature points looking for a lip line is too wide. In other words, the improper extraction of one or two feature points in an ASM adaptation process can result in a higher possibility of improper extraction of other feature points.

Therefore, it is necessary to limit the search region so that the feature points are not improperly extracted during the ASM adaptation process. For this purpose, the present invention performs the ASM adaptation under the condition that the search region where the feature points for facial features are to be extracted is limited in advance, as will be described below.

For example, in the case of eyes, the search region for feature points above the eyes is limited to be less than ½ of the distance to the eyebrows and the search region of feature points below the eyes is limited to be less than ½ of the width of an eye in a vertical direction. In addition, in the case of the nose the search region of feature points corresponding to the nostrils and the rounded sides of the nose is limited to be less than ½ of the distance to the upper lip, and in the case of the lip the search region of feature points above the lip is limited to be less than ½ of the distance to the nostrils and the search region of feature points below the lip is limited to be less than ⅓ of the width of the lip in a vertical direction.

A limit value of the search region is a value that minimizes feature extraction errors produced through a number of experiments, and a high reliability in the extraction of feature points can be achieved by such limitation of the search region.

Referring to FIG. 1 again, the caricature-creating unit 39 includes a face caricature creation unit 39a for creating a three-dimensional face caricature and a body caricature-creating unit 39b for creating a three-dimensional body caricature, which will be described in brief here, but in detail with reference to FIG. 3.

The face caricature-creating unit 39a creates the three-dimensional face caricature reflecting the user's facial features by modifying the three-dimensional polygon face basic model using the facial feature point information extracted through the ASM adaptation, and the body caricature-creating unit 39b creates the three-dimensional body caricature based on three-dimensional body models including such body components as hair, body, glasses, accessories, clothes, and shoes, which are stored in the three-dimensional body model DB 15.

The projecting unit 40 creates a two-dimensional caricature by projecting the three-dimensional caricature created by the caricature-creating unit 39 into a two-dimensional plane if the two-dimensional caricature is required, and the caricature-storing unit 50 stores the three-dimensional caricature created through the caricature-creating unit 39.

On the other hand, the three-dimensional caricature created by the caricature-creating unit 39 can be transmitted through the caricature transmitting/receiving unit 70 to another three-dimensional caricature-creating unit 100 by a wired or wireless means. At this time, the caricature transmitting/receiving unit 70 extracts coordinate values and memory reference values of feature points from the three-dimensional caricature in order to reduce the capacity of data to be transmitted and then transmits the extracted values to another three-dimensional caricature-creating unit 100. The transmitted coordinate values and memory reference values of feature points can be again reconstructed into the three-dimensional caricature through a caricature transmitting/receiving unit 70 within another three-dimensional caricature-creating unit 100. A method of reconstructing the three-dimensional caricature will be in detail described with reference to FIG. 5.

For reference, when the elements of the present invention described above are implemented with hardware, a variety of modifications and equivalents will be apparent to those skilled in the art. For example, the memory unit 10 storing other data in addition to the learning data, the two-dimensional face texture, the three-dimensional polygon face basic model and the three-dimensional body model can be configured to be divided into a plurality of memories if the ASM loading unit 35, the ASM adapting unit 37, the caricature-creating unit 39, etc. include separate memories. In addition, such elements as the ASM loading unit 35, the ASM adapting unit 37, the caricature-creating unit 39, etc. can be implemented with software which is driven by microprocessors.

On the other hand, a three-dimensional caricature creation method according to the present invention comprises the steps of: detecting the positions of eyes from an input facial image and normalizing the size of the facial image; detecting each initial position for facial features from the normalized facial image; loading ASMs in the normalized facial image so as to correspond to the detected initial position and then adapting the loaded ASMs so as to extract feature points for the facial features; and creating a three-dimensional polygon face caricature by loading a three-dimensional polygon face basic model and then modifying the loaded three-dimensional polygon face basic model according to coordinate values of the feature points extracted in the ASM adapting step.

Preferably, the method further comprises a step of obtaining a two-dimensional face caricature by projecting the three-dimensional polygon face caricature into a two-dimensional plane.

Preferably, the method further comprises a step of transmitting coordinate values and memory reference values of the feature points extracted from the three-dimensional polygon face caricature.

Hereinafter, a three-dimensional caricature creation method according to the present invention will be in detail described with reference to the accompanying drawings.

Figure 3:
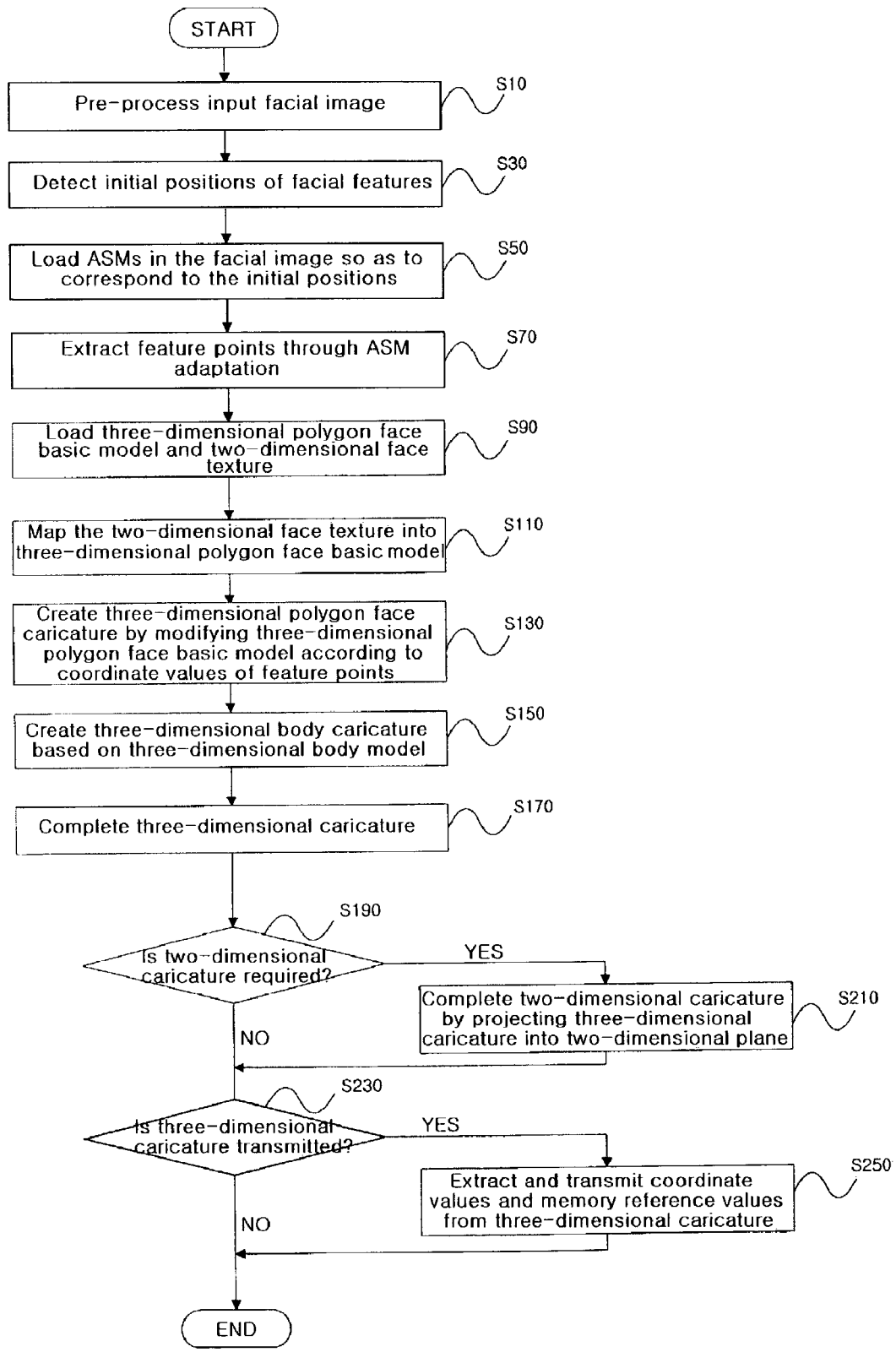
FIG. 3 is a flow chart for explaining a three-dimensional caricature creation method according to the present invention.

FIG. 3 is a flow chart for explaining a three-dimensional caricature creation method according to the present invention.

When a facial image is input, a pre-processing operation for detecting positions of eyes from the input facial image and normalizing the size of the facial image is performed (S10), which will be in detail described below with reference to FIG. 4.

Figure 4:
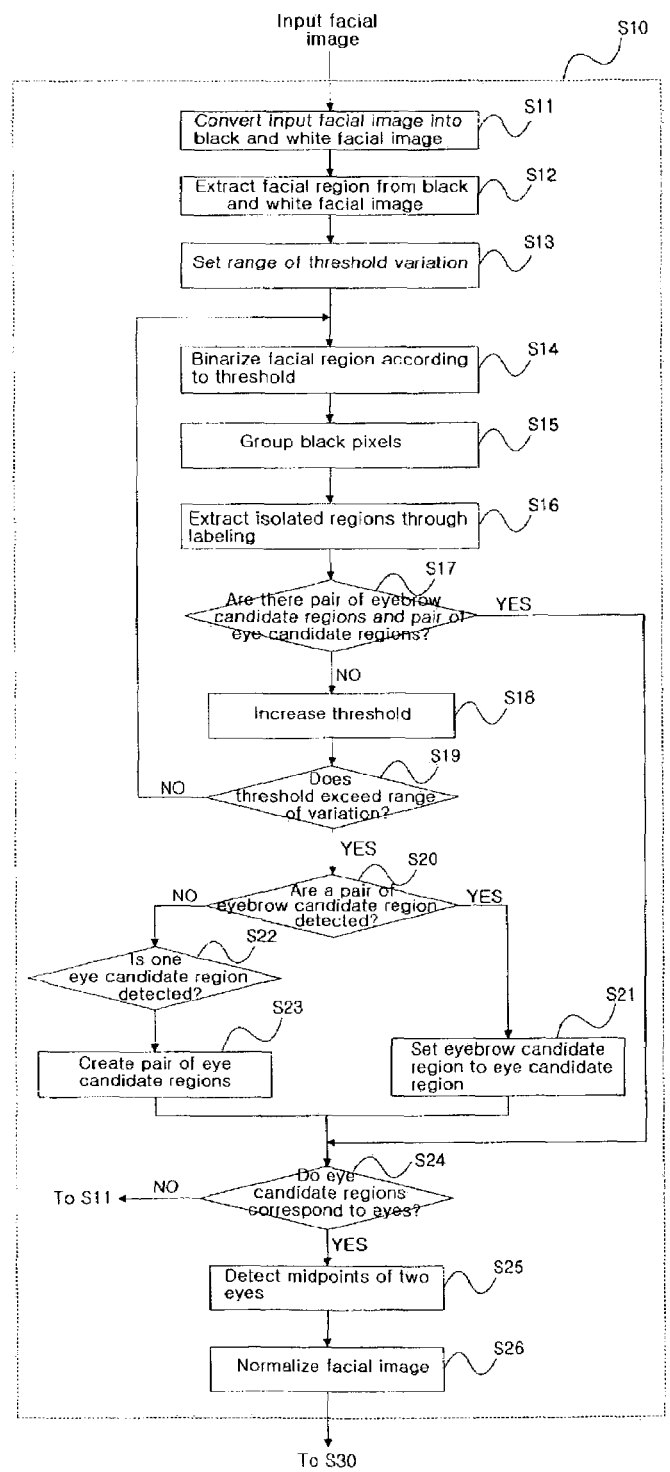
FIG. 4 is a detailed flow chart for explaining a step of pre-processing shown in FIG. 3.

FIG. 4 is a detailed flow chart for explaining a step of pre-processing shown in FIG. 3.

First, if the input facial image is a color image, it is converted into a black and white image (S11), and then a facial region is detected from the black and white image by using the Gabor Filter Response (S12).

Next, binarization is performed with an increasing threshold until all of two eyebrows and two eyes appear to have a specific black region in the facial image. This binarization includes setting a range of threshold variation for the binarization, setting an initial value for the threshold within the set range of threshold variation, and then assigning white colors to pixels having brightness value above the threshold and black color to pixels having brightness with a value below the threshold on the basis of the initially set value of the threshold (S13 and S14).

Here, the range of threshold variation is preferably set according to the brightness of the input facial image. This is because the amount of unnecessary computation can be reduced when the range of threshold variation is set on the basis of the brightness of a given facial image.

After completing the binarization of the facial image, a grouping operation is performed for tying pixels having a black color in regions corresponding to the eyebrows and the eyes into a plurality of groups (S15). At this time, when a gap between black pixels spaced in a horizontal direction is calculated and the calculated gap is less than a predetermined distance, it is possible to also reduce errors caused by noise by connecting the black pixels together. A connectable distance between black pixels is typically preferable to be less than 5 in a facial image having a resolution of 640*480. This value can vary depending on the resolution of facial image.

Next, various groups formed by the grouping process are sequenced by labeling them and then regions having the same label are extracted as isolated regions (S16). At this time, as a labeling algorithm, a 4-way connection trace algorithm or an 8-way connection trace algorithm can be used. Since labeling requires a lot of time if the number of groups in the facial image is large, regions having groups whose sizes are less than 3 to 4 are preferably removed as noise.

Next, it is determined whether there are a pair of eyebrow candidate regions and a pair of eye candidate regions among the isolated regions extracted by the labeling, and if neither eyebrows nor eyes are detected, the binarization is performed with an increasing threshold until a pair of eyebrows and a pair of eyes are detected (S17 to S19). At this time, the threshold is preferably increased within the set range of variation.

If it is determined that there are a pair of eyebrow candidate regions and a pair of eye candidate regions among the isolated regions, an error rate for the eye candidate region is calculated based on the information on the size, shape and position of the eyes and then it is determined whether the calculated error rate is within an allowable range in order to verify whether the eye candidate region corresponds to the eyes. A method of calculating the error rate for the eye candidate region will be described in more detail below.

In general, eyes have an oval shape, occupy 0.2% to 2.5% of the entire facial region area, and are positioned in an upper portion of the facial region in a vertical direction, and right and left eyes are positioned on the same horizontal line. Such information on the size, shape and position of the face can be used to determine whether the eye candidate region corresponds to the eyes.

Namely, the error rate for the eye candidate region can be calculated with the information on the size, shape and position of the eyes as a reference value and then it can be determined whether the eye candidate region corresponds to the eyes according to the calculated error rate.

First, in order to calculate the error rate for the eye candidate region, deviation values for the size, ratio of width to length, vertical position and horizontal position of the eye candidate region with respect to the reference value are obtained.

Here, the size, ratio of width to length, vertical position and horizontal position of the eye candidate region can be easily obtained according to information on the isolated regions obtained when the labeling is performed. In other words, when the isolated regions are extracted by the labeling, an XY coordinate for each isolated region is obtained and a size, ratio of width to length, vertical position and horizontal position of each isolated region can be calculated according to the obtained XY coordinate.

Meanwhile, since sizes, ratios of width to length, vertical positions and horizontal positions of the eyes can vary according to the threshold for the binarization, a reference value according to the threshold for the binarization should be obtained when a deviation value for the eye candidate region is obtained.

Figure 9:
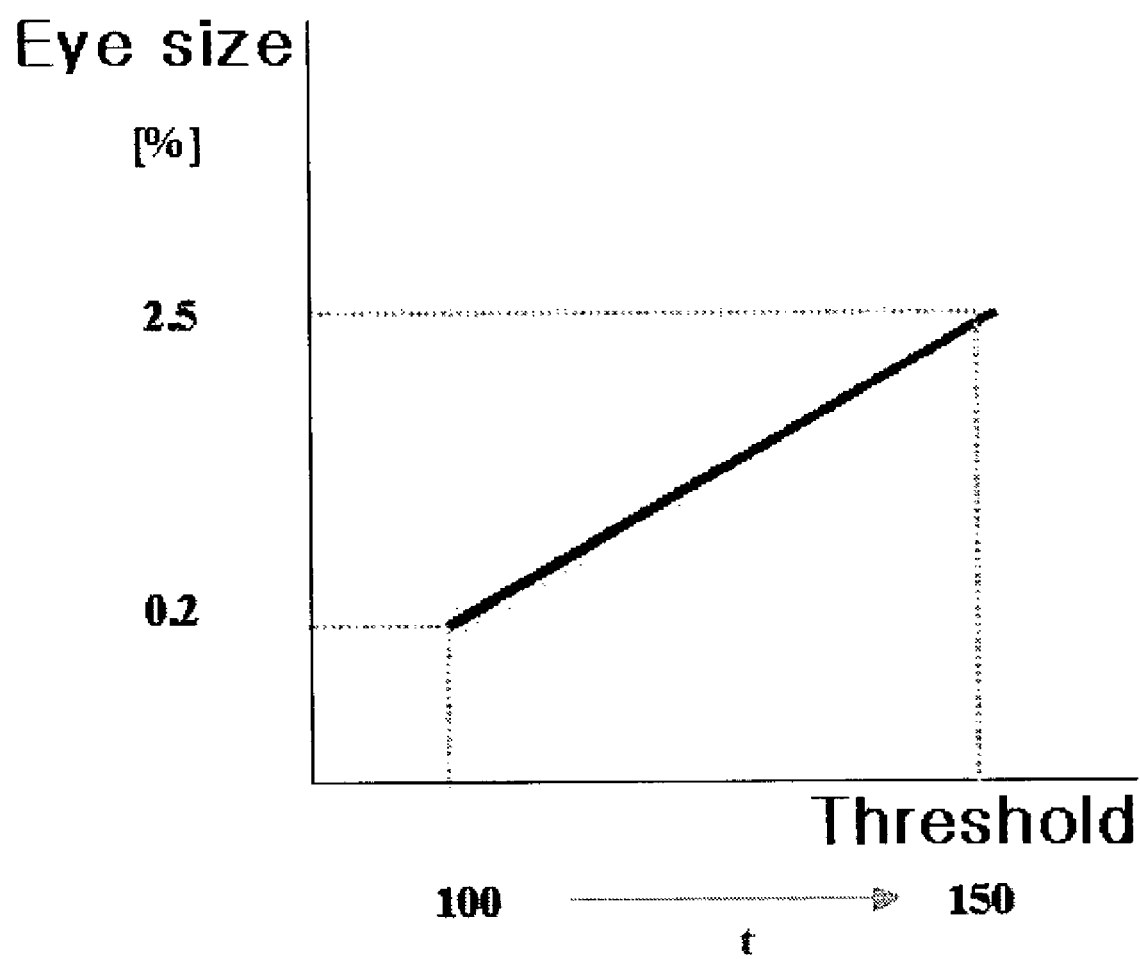
FIG. 9 is a graph showing a variation of the size occupied by eyes in a facial image according to a threshold variation of the binarization.

One example where the reference value for the eye candidate region varies according to the threshold for the binarization is shown in FIG. 9. As shown in FIG. 9, since the size occupied by the eyes in the facial image increases as the threshold is increased, a deviation value for the eye candidate region should be obtained on the basis of a reference value for a corresponding threshold. Likewise, for ratios of width to length, vertical positions and horizontal positions of the eyes, a deviation value for the eye candidate region should be obtained on the basis of a reference value for a corresponding threshold.

In this embodiment, when the reference value for the size of the eyes is set from 0.2% to 2.5% of the entire facial region, it is determined that the eye candidate region is an eye if the size of the eye candidate region is between 0.2% to 2.5% of the entire facial region, and when the reference value for the ratio of width to length of the eyes is set to be 1.0 to 3.2, it is determined that the eye candidate region is not an eye if the ratio of width to length of the eye candidate region is less than 1.0 or more than 3.2, i.e., the eye candidate region is not oval.

Additionally, in this embodiment, when the reference value for the vertical position of the eyes in the entire facial region is set to be ⅓, it is determined that the eye candidate region is an eye if the eye candidate region is positioned in the upper portion of the entire facial region in a vertical direction, and when the reference value for the horizontal position of the eyes in the entire facial region is set to be 5°, it is determined that the eye candidate region is an eye if right/left eye candidate regions exist on the almost the same horizontal line.

Assuming that deviation values for the size, ratio of width to length, vertical position and horizontal position of the eye candidate region are $D_1$, $D_2$, $D_3$, and $D_4$, respectively, and weights for the deviation values are $k_1$, $k_2$, $k_3$, and $k_4$, respectively, an equation with respect to an error rate (Er) for the eye candidate region is given as the following equation (1).

$$\text{Error\_rate(Er)(\%)} = \{k_1*|D_1|+k_2*|D_2|+k_3*|D_3|+k_4*|D_4|\}*100 \quad (1)$$

In the equation 1, weights $k_1$, $k_2$, $k_3$, and $k_4$ for the deviation values can be defined based on the result of learning the facial image. For example, if a learning result indicates that there is a high probability that the eyes correspond to regions having a size of 0.2% to 2.5% of the entire facial region, a weight k1 for the size of the eye candidate region can be set to a value larger than the remaining weights k2, k3 and k4, and the weights k1, k2, k3 and k4 for the respective deviation values can vary.

If it is determined that the error rate Er for the eye candidate region is within an allowable range (e.g., 30%), in other words, the size, shape or position of the eye candidate region is suitable, midpoints of two eyes are detected from the eye candidate region (S24 and S25).

As described above, when the error rate Er for the eye candidate region is calculated, since all of the deviation values for the size, shape and position of the eye candidate region are considered, the possibility that the eyebrows are wrongly recognized as the eyes can be minimized. Accordingly, the midpoints of the two eyes can be correctly detected even in a facial image having a low resolution.

On the other hand, if eyebrows of a user are white, the eyebrows may not be detected at all. In this case, the decision unit 27 recognizes right and left eyes detected through the binarization as the eyebrow candidate region and performs the binarization with an increasing threshold value for a region below the detected eyes until the eye candidate region is detected (S11 to S19). However, if a pair of eye candidate regions cannot be detected even by performing a binarization process with a maximal threshold, the region recognized as the eyebrow candidate region is set as the eye candidate region (S20 and S21), and if it is determined that the error rate Er calculated for the eye candidate region is within an allowable range, the midpoints of the two eyes in the eye candidate region are detected (S24 and S25).

In addition, if one of two eyebrows of a user is shielded by hair, only the remaining eyebrow may be detected. In this case, if only one isolated region (eyebrow) is detected through the binarization, the decision unit 27 disregards the detected isolated region and continues the binarization. If right and left eyes are detected through the binarization, the decision unit 27 recognizes the detected eyes as the eyebrow candidate region and performs the binarization with an increasing threshold for a region below the detected eyes until the eye candidate region is detected (S11 to S19). However, if a pair of right and left symmetrical eye candidate regions cannot be detected even by performing a binarization process with a maximal threshold, the region recognized as the eyebrow candidate region is set as the eye candidate region (S20 and S21), and if it is determined that the error rate Er calculated for the eye candidate region is within the allowable range, the midpoints of the two eyes in the eye candidate region are detected (S24 and S25).

On the other hand, if one of two eyebrows and one of two eyes of a user are shielded by hair, a pair of isolated regions cannot be detected even by performing a binarization process with a maximal threshold. In this case, if one eye candidate region exists in any one of right and left sides, a pair of eyes are created based on the one eye candidate region (S22 and S23), and then, if it is determined that the error rate Er calculated for the created pair of eye candidate regions is within the allowable range, the midpoints of the two eyes in the eye candidate region are detected (S24 and S25).

A case where both eyes are shielded by hair has been excluded from the present invention. This is because there is little possibility of both eyes being shielded, although both eyebrows can be shielded by hair in a typical facial image.

In addition, in this embodiment, although verification criteria for the eye candidate region were limited to the size, ratio of width to length, vertical and horizontal positions and the error rate for the eye candidate region was calculated with such limitations, alternatively, other various criteria can be employed.

Next, based on the positions of the two eyes, the size of the facial region is normalized (S26) such that the facial region can be mapped in a one to one ratio with the three-dimensional face basic model stored in the three-dimensional polygon face basic model DB 15. At this time, if the facial image is at a slight inclined angle, it is possible to correct the inclined angle to be a normal angle.

Referring to FIG. 3 again, after the pre-processing for the facial image described above has been completed, when the facial feature initial position-detecting unit 33 detects the initial position for each facial feature by applying the Canny filter to the facial region (S30); the ASM loading unit 31 loads the ASM into the pre-processed facial image so as to correspond to the detected initial position (S50).

On the other hand, in addition to the use of the Canny filter in detecting the initial position of facial features, it is possible to detect the initial positions of eyebrows, eyes, nose and mouth by using geometrical positional relations between facial features based on the center points of two eyes detected through the binarization.

Next, the ASM adapting unit 37 extracts feature points for eyebrow, eye, nose, mouth, or face contours from the pre-processed facial image by performing an adaptation of the loaded ASMs using data on shape variation characteristics of the ASM stored in the learning data DB 11 (S70).

When the feature points are extracted, the ASM adaptation is performed under the condition that the search region for the extraction of the feature point for each facial feature is limited in advance. The limitation of search regions has been described in detail with reference to FIG. 1, and therefore a detailed explanation thereof will be omitted.

Next, the face caricature-creating unit 39a loads the three-dimensional face basic model and the two-dimensional face texture from the three-dimensional polygon face basic model DB 15 and the two-dimensional face texture DB 13, respectively (S90), maps the loaded two-dimensional face texture into the three-dimensional face basic model (S110), and then creates the three-dimensional polygon face caricature by modifying the three-dimensional face basic model according to coordinate values of the extracted feature points (S130).

Figure 12:
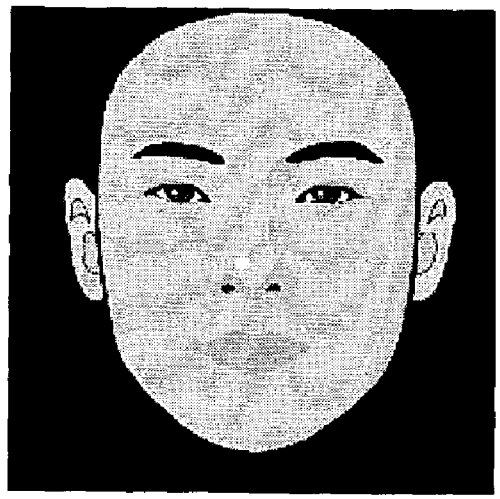
FIG. 12 is a view for explaining the creation of a three-dimensional polygon face caricature.
Figure 12:
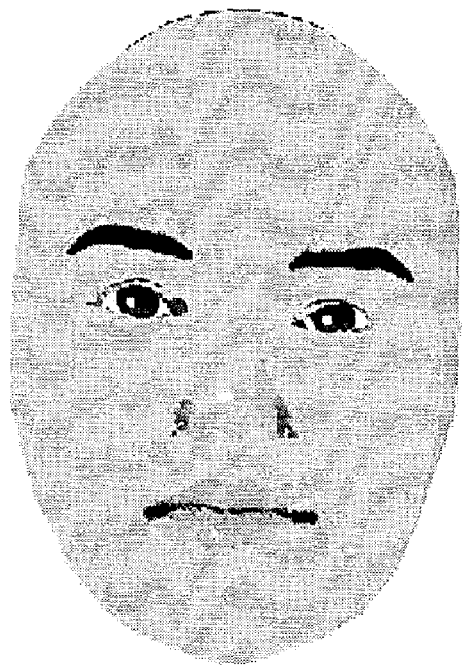

Here, the two-dimensional face texture is for applying skin color, eyebrow color, lip color, etc. to the three-dimensional face basic model, as shown in FIG. 12(a), and it can be seen that more natural and elaborate three-dimensional face caricatures are created by mapping the two-dimensional face texture into the three-dimensional face basic model, as shown in FIG. 12(b).

A modification of the three-dimensional face basic model according to the coordinate values of the extracted feature points will be briefly described as follows. The feature points extracted through the ASM adapting unit 37 have XY coordinate values. When the feature points are applied to the three-dimensional face basic model based on these XY coordinate values, polygon components on the three-dimensional face basic model are displaced, and accordingly the three-dimensional face basic model is modified to become similar to the user's face.

Figure 13:
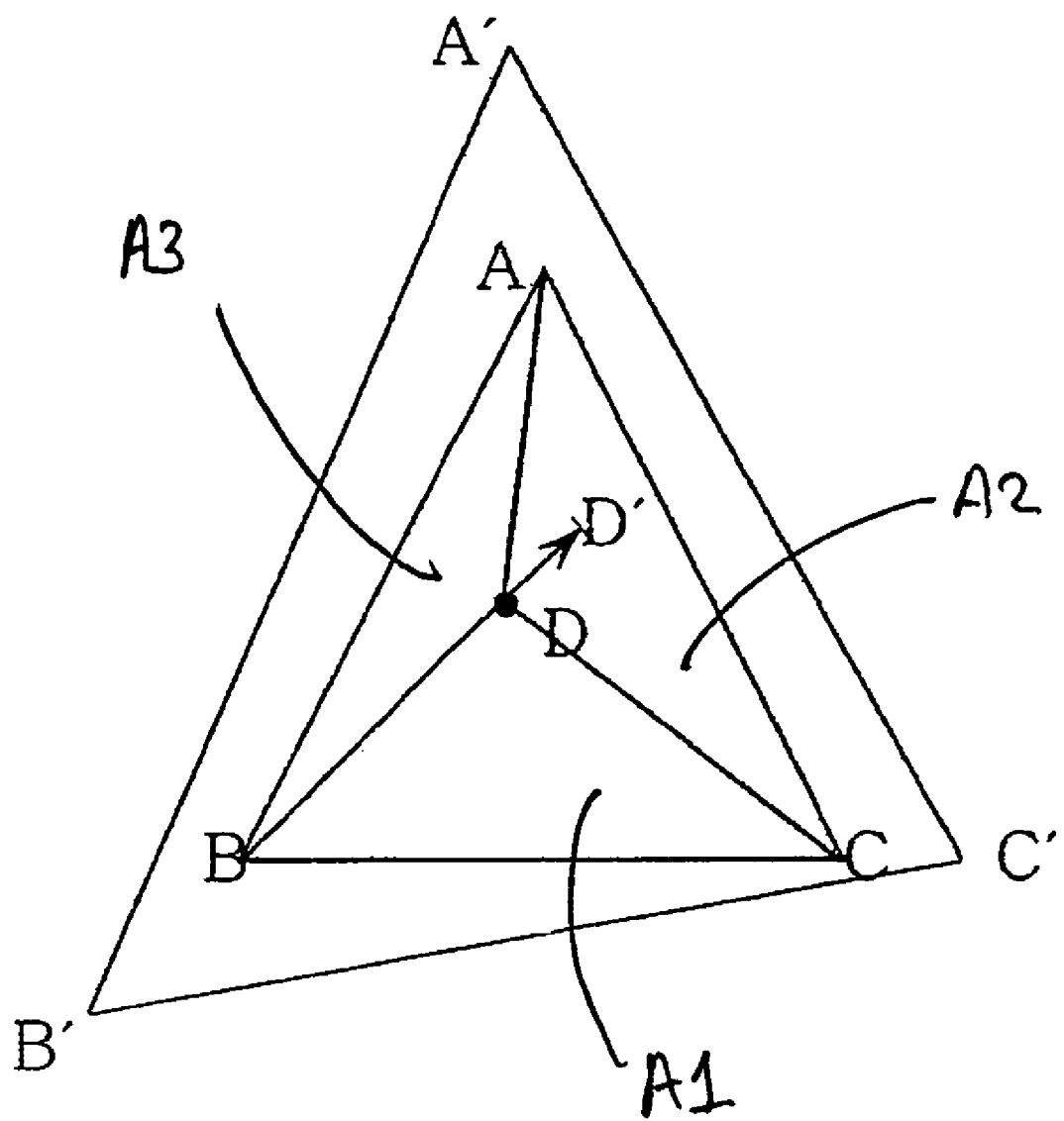
FIG. 13 is a view for explaining a modification of a three-dimensional polygon face basic model.

FIG. 13 is a view for explaining the modification of the three-dimensional polygon face basic model. As shown in FIG. 13, it is assumed that basic feature points on the three-dimensional face basic model are A, B, C, a prescribed polygon within a triangle formed by the feature points A, B and C is D, an area of ΔABC is Area, an area of ΔDBC is A1, an area of ΔDAC is A2, and an area of ΔDAB is A3.

When feature points A', B' and C' are extracted by the ASM adaptations are applied to the three-dimensional face basic model, the basic feature points A, B and C on the three-dimensional face basic model move to A', B' and C', respectively. Accordingly, the polygons on the three-dimensional face basic model are also displaced. Here, the displacement D' of the polygon D is given as the following equation (2).

$$\overrightarrow{OD'}=\overrightarrow{OD}+w1\times\overrightarrow{DA'}+w2\times\overrightarrow{DB'}+w3\times\overrightarrow{DC'} \quad (2)$$

In the equation 2, w1, w2, and w3 are equal to A1 divided by Area, A2 divided by Area, and A3 divided by Area, respectively, as follows:

$$w1 = \frac{A1}{\text{Area}}, w2 = \frac{A2}{\text{Area}}, w3 = \frac{A3}{\text{Area}}$$

When the polygon D is displaced according to the application of the feature points, polygons around the polygon D are also displaced in a similar manner. Accordingly, the three-dimensional face basic model is modified to become similar to the user's face as a whole.

When the extracted feature points are applied to the three-dimensional face model, information except an XY coordinate value, e.g. a coordinate value in a Z-axis direction, uses anthropological standard data included in the three-dimensional face basic model. For example, if the XY coordinate value of a feature point extracted through the ASM adaptation is (170, 210), an XYZ coordinate of the feature point is (170, 210, 35) when the XY coordinate (170, 210) is applied to the three-dimensional face basic model. Here, a coordinate value 35 in the Z-axis direction is an anthropological standard data value included in the three-dimensional face basic model.

On the other hand, in addition to the exact use of anthropological standard data included in the three-dimensional face basic model, a three-dimensional caricature more similar to the user's face can be created by further using a side facial image, which will be described below.

First, when a side facial image is input, the pre-processing unit 31 detects an end point of the nose and the eyebrows from the input side facial image and then normalizes the side facial image based on the detected end point of the nose and the detected eyebrows. The facial feature initial position-detecting unit 33 detects side initial positions for facial features from the normalized side facial image. Then, the ASM loading unit 35 loads side ASMs stored in the memory unit 10 in the normalized side facial image so as to correspond to the detected side initial positions. The ASM adapting unit 37 extracts YZ coordinate values of feature points for eyebrow, eye, lip or face contours from the normalized side facial image by performing an adaptation of the loaded side ASMs. Then, the face caricature-creating unit 39a creates a three-dimensional polygon face caricature by modifying the three-dimensional polygon face basic model according to XY and YZ coordinate values of the feature points extracted through ASM adapting unit 37.

In addition, the face basic model can be modified by using a snake algorithm in order to create a three-dimensional caricature similar to a user's face and emphasized with comicality or hyperbole. A method of modifying the three-dimensional face basic model using the snake algorithm will be briefly described below.

The snake algorithm is a method for extracting lines, edges, contours, etc. from an image by performing minimization of energy such as image forces. In the present invention, a caricature similar to a user's face and emphasized with comicality or hyperbole is created by performing an XY position transformation while possibly maintaining the relative position between feature points and the configuration constructed by feature points, and then performing an XYZ position transformation for the remaining adjacent feature points based on coordinate values on the basic model by applying the snake algorithm.

Figure 14:
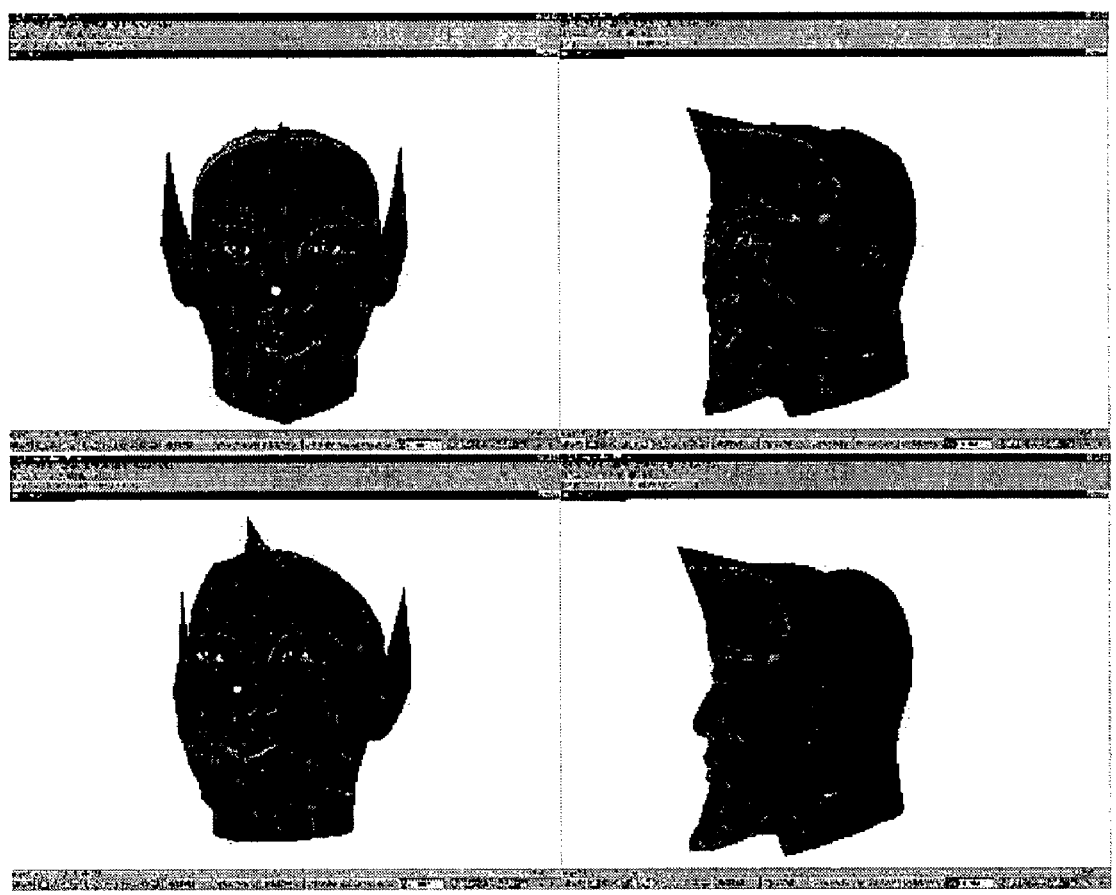
FIG. 14 is a view showing one example of a caricature having emphasized hyperbole.

One example of a caricature emphasized with hyperbole is shown in FIG. 14. As shown in FIG. 14, a variety of three-dimensional characters similar to a user's face can be created by using a hyperbolic three-dimensional face basic model and applying only important face features to the three-dimensional face basic model.

Referring to FIG. 3 again, after the three-dimensional polygon face caricature is created, the body caricature-creating unit 39b creates a three-dimensional body caricature based on the three-dimensional body model stored in the three-dimensional body model DB 17 (S150), and finally completes a three-caricature by combining the three-dimensional polygon face caricature with three-dimensional body caricature (S170).

Meanwhile, a two-dimensional caricature, if necessary, is created by projecting the three-dimensional caricature into a two-dimensional plane through the projecting unit 40 (S190 to S210). In addition, if the transmission of the three-dimensional caricature is required, the coordinate values and memory reference values of the feature points extracted from the three-dimensional caricature are transmitted (S230 to S250). A method of reconstructing the three-dimensional caricature again based on the transmitted coordinate values and memory reference values of the feature points will be described below.

Figure 5:
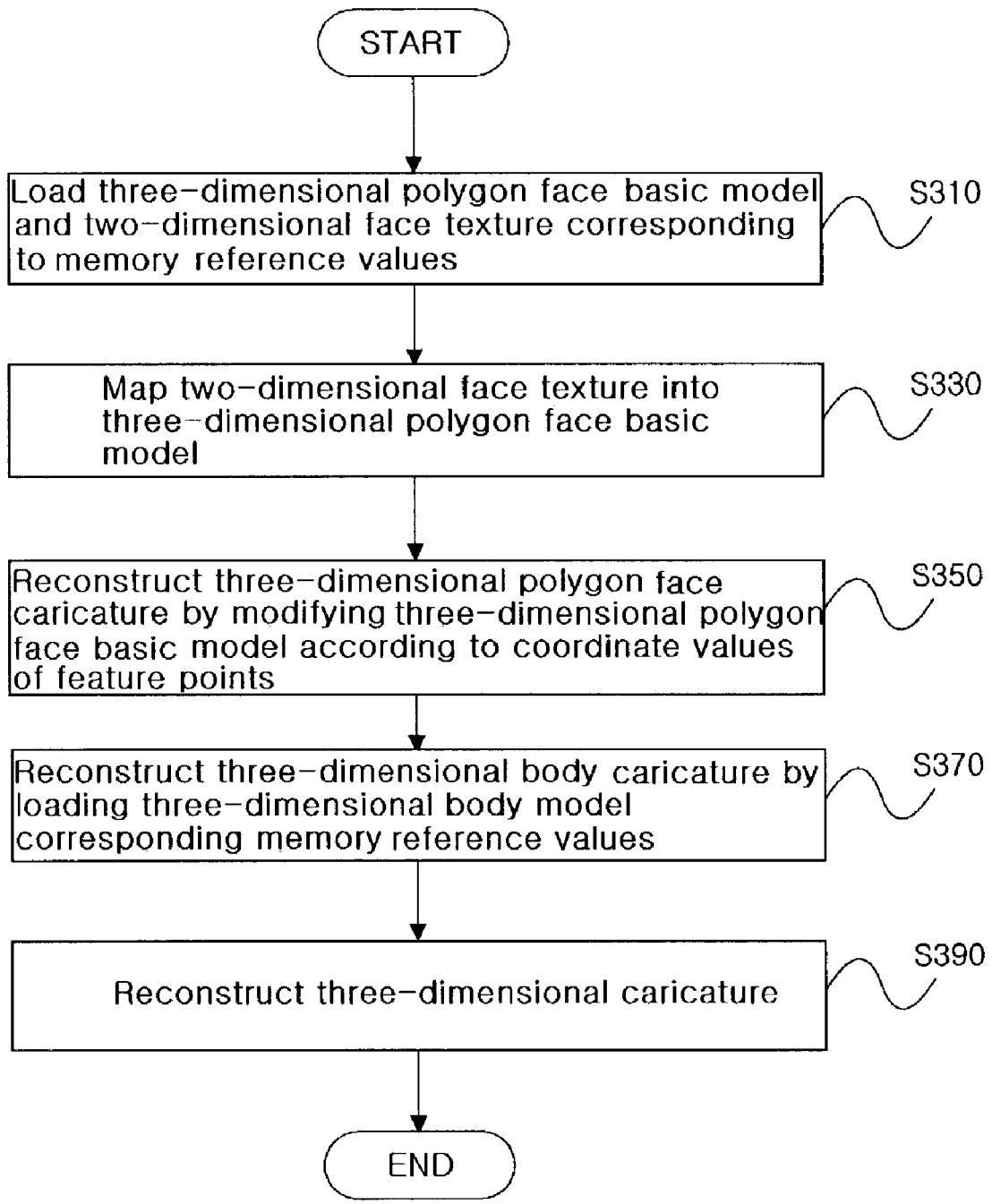
FIG. 5 is a flow chart for explaining a method of reconstructing a transmitted three-dimensional caricature in FIG. 3.

FIG. 5 is a flow chart for explaining a method of reconstructing a transmitted three-dimensional caricature in FIG. 3.

First, when the coordinate values and memory reference values of the feature points extracted from the three-dimensional caricature are received, the face caricature-creating unit 39a loads the three-dimensional face basic model and the two-dimensional face texture corresponding to the memory reference values received from the three-dimensional polygon face basic model DB 15 and the two-dimensional face texture DB 13 (S310).

Next, the face caricature-creating unit 39 a reconstructs the three-dimensional polygon face caricature by modifying the three-dimensional face basic model based on the coordinate values of the feature points received after mapping the two-dimensional face texture into the three-dimensional face basic model (S330 to S350).

Next, the body caricature-creating unit 39b reconstructs the three-dimensional body caricature by loading the three-dimensional body model corresponding to the received memory reference values from the three-dimensional body model DB 17 and then reconstructs a three-dimensional caricature by combining the reconstructed three-dimensional polygon face caricature with the reconstructed three-dimensional body caricature (S370 to S390).

The method of transmitting and reconstructing the three-dimensional caricature described above is applicable to various fields including communication terminals such as caricature sticker vending machines, computers, portable phones and PDAs, games using avatars, and Internet chatting services, if they have a database making it possible to reconstruct a three-dimensional caricature, in addition to three-dimensional caricature creation devices 100 and 100. For example, a three-dimensional caricature transmitted from the caricature sticker vending machines can be reconstructed at an Internet avatar site or a three-dimensional caricature transmitted from a computer can be reconstructed on a portable phone.

As described above, according to the three-dimensional caricature creation apparatus and method of the present invention, since the information on feature points of elements characterizing a face can be correctly extracted by using the ASM technique specialized for faces, a three-dimensional caricature having a high similarity to a user's face can be created.

In addition, according to the present invention, if a two-dimensional caricature is required, it can be easily obtained by projecting the three-dimensional caricature onto a two-dimensional plane. Also, when transmission of the three-dimensional caricature is required, since only information on facial features and memory reference values used for the three-dimensional caricature are transmitted, a system load can be minimized.

Furthermore, according to the present invention, the three-dimensional caricature can be simply reconstructed and used at communication terminals such as caricature sticker vending machines, computers, portable phones and PDAs, or on an Internet.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. An apparatus for creating a three-dimensional caricature based on a user's input facial image, comprising:
   a memory unit for storing ASMs (Active Shape Models) required to create the three-dimensional caricature, and three-dimensional polygon face basic models;
   a pre-processing unit for detecting positions of eyes from the input facial image and normalizing the size of the facial image, the pre-processing unit calculating deviation values for eye candidate regions, calculating an error rate for the eye candidate regions by assigning a weight to each of the deviation values and summing the deviation values together, and determining whether the error rate for the eye candidate regions is within an allowable range;

a facial feature initial position-detecting unit for detecting each initial position for facial features from the normalized facial image;

an ASM loading unit for loading the ASMs stored in the memory unit in the normalized facial image so as to correspond to the detected initial position;

an ASM adapting unit for adapting the loaded ASMs so as to extract feature points for the facial features; and a caricature-creating unit for creating a three-dimensional polygon face caricature by loading the three-dimensional polygon face basic model from the memory unit and then modifying the loaded three-dimensional polygon face basic model according to coordinate values of the feature points extracted through the ASM adapting unit.

2. The apparatus as claimed in claim 1, wherein the pre-processing unit includes:

a desaturing unit for, if the input facial image is a color image, converting the color image into a black and white image;

a facial region-detecting unit for detecting a facial region from the input facial image by using a Gabor filter response;

an eye-detecting unit for detecting positions of eyes from the detected facial region through the facial region-detecting unit; and a face-normalizing unit for normalizing the size of face region such that the face region can be mapped in a one to one ratio with the three-dimensional polygon face basic model stored in the memory unit based on the positions of eyes detected through the eye-detecting unit.

3. The apparatus as claimed in claim 2, wherein the eye-detecting unit includes:

a binarization unit for performing binarization for the input facial image on the basis of a threshold;

a grouping unit for grouping black pixels in a region corresponding to eyebrows and eyes when the binary coded facial image is input from the binarization unit;

a labeling unit for sequencing a plurality of groups by labeling the plurality of groups detected through the grouping unit and then extracting regions having the same label for isolated regions; and a decision unit for setting eyebrow candidate regions and eye candidate regions among the isolated regions extracted by the labeling unit and then determining whether the set eye candidate regions correspond to eyes.

4. The apparatus as claimed in claim 3, wherein the decision unit performs the binarization while varying the threshold until all of the eyebrow candidate regions and the eye candidate are detected.

5. The apparatus as claimed in claim 1, wherein the facial feature initial position-detecting units detects each initial position for the facial features by applying a Canny filter to the normalized facial image.

6. The apparatus as claimed in claim 1, wherein the memory unit further stores data on shape variation characteristics of the ASMs, and the ASM adapting unit extracts feature points for eyebrow, eye, nose, lip or face contours from the normalized facial image by using the data on shape variation characteristics of the ASMs stored in the memory unit.

7. The apparatus as claimed in claim 1, wherein the ASM adapting unit limits in advance search regions for the extraction of the feature points of the facial features when the feature points are extracted.

8. The apparatus as claimed in claim 1, wherein the memory unit further stores a two-dimensional face texture for texturing the three-dimensional polygon face basic model, and the caricature-creating unit maps the two-dimensional face texture stored in the memory unit into the three-dimensional polygon face basic model.

9. The apparatus as claimed in claim 1, wherein the memory unit further stores a three-dimensional body model required to create a three-dimensional body caricature, and the caricature-creating unit creates the three-dimensional body caricature based on the three-dimensional body model stored in the memory unit.

10. The apparatus as claimed in claim 1, wherein, when a side facial image is input, the pre-processing unit detects an end point of the nose and eyebrows from the input side facial image and then normalizes the side facial image based on the detected end point of the nose and the detected eyebrows;

the facial feature initial position-detecting unit detects each side initial position for facial features from the normalized side facial image;

the ASM loading unit loads side ASMs stored in the memory unit in the normalized side facial image so as to correspond to the detected side initial position;

the ASM adapting unit adapts the loaded side ASMs so as to extract coordinate values of feature points for the facial features from the normalized side facial image; and the caricature-creating unit creates a three-dimensional polygon face caricature by modifying the three-dimensional polygon face basic model according to the coordinate values of the feature points extracted through the ASM adapting unit.

11. The apparatus as claimed in claim 1, further comprising a projecting unit for obtaining a two-dimensional face caricature by projecting the three-dimensional polygon face caricature created by the caricature-creating unit onto a two-dimensional plane.

12. The apparatus as claimed in claim 1, further comprising a caricature transmitting/receiving unit for transmitting/receiving coordinate values and memory reference values of the feature points extracted from the three-dimensional polygon face caricature created through the caricature-creating unit.

13. The apparatus as claimed in claim 12, wherein, when the coordinate values and memory reference values of the feature points extracted from the three-dimensional polygon face caricature are received from the caricature transmitting/receiving unit, the caricature-creating unit loads a three-dimensional polygon face basic model and a two-dimensional face texture corresponding to the received memory reference values from the memory unit, maps the two-dimensional face texture onto the three-dimensional polygon face basic model, and then reconstructs a three-dimensional polygon face caricature by modifying the three-dimensional polygon face basic model according to the coordinate values of the received feature points.

14. The apparatus of claim 1 wherein said ASM adapting unit performs the function of adapting said ASM by:

connecting feature points of the ASMs by a straight line;

defining a search region normal to said straight line at the midpoint thereof, said search region being limited in size;

searching within said search region for a pixel having a maximal correlation with a basic learning value of the ASM and using said pixel as a new midpoint; and changing the positions of said feature points according to said new midpoint.

15. The apparatus of claim 14 wherein said limit of the size of said search region is determined by the distances between the facial features on said facial image.

16. A method for creating a three-dimensional caricature based on a user's input facial image, comprising the steps of:
performing pre-processing by detecting positions of eyes from the input facial image and normalizing the size of the facial image, the pre-processing unit calculating deviation values for eye candidate regions, calculating an error rate for the eye candidate regions by assigning a weight to each of the deviation values and summing the deviation values together, and determining whether the error rate for the eye candidate regions is within an allowable range;
detecting each initial position for facial features from the normalized facial image;
loading ASMs in the normalized facial image so as to correspond to the detected initial position and then adapting the loaded ASMs so as to extract feature points for the facial features; and
creating a three-dimensional polygon face caricature by loading a three-dimensional polygon face basic model and then modifying the loaded three-dimensional polygon face basic model according to coordinate values of the feature points extracted in the ASM adapting step.

17. The method as claimed in claim 16, wherein the step of performing the pre-processing comprises:
if the input facial image is a color image, converting the color image into a black and white image;
detecting a facial region from the input facial image by using a Gabor filter response;
detecting the positions of eyes from the detected facial region; and
normalizing the size of the facial region such that the facial region can be mapped in a one to one ratio with the three-dimensional polygon face basic model based on the detected positions of the eyes.

18. The method as claimed in claim 17, wherein the step of detecting the positions of the eyes comprises:
performing binarization for the input facial image on the basis of a threshold;
grouping black pixels in the binary coded facial image;
sequencing a plurality of groups by labeling the plurality of groups detected in the step of grouping and then extracting regions having the same label for isolated regions; and
setting eyebrow candidate regions and eye candidate regions among the extracted isolated regions and then detecting midpoints of both eyes from the set eye candidate regions.

19. The method as claimed in claim 18, wherein the step of performing the binarization comprises the steps of setting a range of threshold variation according to brightness of the input facial image, setting an initial value for threshold within the set range of threshold variation, and then performing the binarization for the input facial image on the basis of the set initial value of the threshold.

20. The method as claimed in claim 18, wherein the grouping step comprises the step of connecting the black pixels together when a gap between black pixels spaced in a horizontal direction is calculated and the calculated gap is less than a predetermined distance.

21. The method as claimed in claim 18, wherein the labeling step comprises the step of removing groups having sizes less than a predetermined size among the plurality of groups detected in the grouping step, which are regarded as noise.

22. The method as claimed in claim 18, further comprising the step of, if there are no pair of eyebrow candidate regions and pair of eye candidate regions among the extracted isolated regions, performing the binarization while increasing the threshold until both a pair of eyebrow candidate regions and a pair of eye candidate regions are detected.

23. The method as claimed in claim 16, wherein the step of detecting each initial position comprises the step of determining an initial position of each facial feature by applying a Canny filter to the normalized facial image.

24. The method as claimed in claim 16, wherein the step of extracting the feature points comprises the step of extracting the feature points for eyebrow, eye, nose, lip or face contours from the normalized facial image by using data on shape variation characteristics of ASMs.

25. The method as claimed in claim 16, wherein search regions of extraction of the feature points for facial features are limited in advance when the feature points are extracted.

26. The method as claimed in claim 16, further comprising the step of mapping a two-dimensional face texture onto the three-dimensional polygon face basic model.

27. The method as claimed in claim 16, further comprising the step of creating the three-dimensional body caricature based on a three-dimensional body model.

28. The method as claimed in claim 16, further comprising the steps of, when a side facial image is input,
detecting an end point of nose and eyebrows from the input side facial image and then normalizing the side facial image based on the detected end point of nose and the detected eyebrows;
detecting each side initial position for facial features from the normalized side facial image;
loading side ASMs in the normalized side facial image so as to correspond to the detected side initial position;
adapting the loaded side ASMs so as to extract coordinate values of feature points for the facial features from the normalized side facial image; and
creating a three-dimensional polygon face caricature by modifying the loaded three-dimensional polygon face basic model according to the coordinate values of the feature points extracted in the adapting step.

29. The method as claimed in claim 16, further comprising the step of obtaining a two-dimensional face caricature by projecting the three-dimensional polygon face caricature onto a two-dimensional plane.

30. The method as claimed in claim 16, further comprising the step of transmitting coordinate values and memory reference values of the feature points extracted from the three-dimensional polygon face caricature.

31. The method as claimed in claim 30, further comprising the steps of, when the coordinate values and memory reference values of the feature points extracted from the three-dimensional polygon face caricature are received,
loading a three-dimensional polygon face basic model and a two-dimensional face texture corresponding to the received memory reference values;
mapping the two-dimensional face texture onto the three-dimensional polygon face basic model; and
reconstructing a three-dimensional polygon face caricature by modifying the three-dimensional polygon face basic model according to the coordinate values of the received feature points.

32. The method as claimed in claim 16 wherein said step of adapting the loaded ASMs comprises the steps of:

connecting feature points of the ASMs by a straight line;

defining a search region normal to said straight line at the midpoint thereof, said search region being limited in size;

searching within said search region for a pixel having a maximal correlation with a basic learning value of the ASM and using said pixel as a new midpoint; and changing the positions of said feature points according to said new midpoint.

33. The method as claimed in claim 32 wherein said limit of the size of said search region is determined by the distances between the facial features on said facial image.

34. A method for creating a three-dimensional caricature based on a user's input facial image, comprising the steps of:

if the input facial image is a color image, converting the color image into a black and white image;

detecting a facial region from the input facial image by using a Gabor filter response;

performing binarization for the input facial image on the basis of a threshold;

grouping black pixels in the binary coded facial image;

sequencing a plurality of groups by labeling the plurality of groups detected in the step of grouping and then extracting regions having the same label for isolated regions;

setting eyebrow candidate regions and eye candidate regions among the extracted isolated regions;

comparing information on the eye candidate regions with reference values stored in advance and then calculating deviation values for the eye candidate regions;

calculating an error rate for the eye candidate regions by assigning a weight to each of the deviation values and summing the deviation values together;

determining whether the error rate for the eye candidate regions is within an allowable range;

normalizing the size of the facial region such that the facial region can be mapped in a one to one ratio with the three-dimensional polygon face basic model based on the detected positions of the eyes;

detecting each initial position for facial features from the normalized facial image;

loading ASMs in the normalized facial image so as to correspond to the detected initial position and then adapting the loaded ASMs so as to extract feature points for the facial features; and creating a three-dimensional polygon face caricature by loading a three-dimensional polygon face basic model and then modifying the loaded three-dimensional polygon face basic model according to coordinate values of the feature points extracted in the ASM adapting step.

35. The method as claimed in claim 34, wherein the reference values stored in advance include values for the size, ratio of width to length, vertical position and horizontal position of the eyes.

36. The method as claimed in claim 34, wherein the information on eye candidate regions is compared with the reference values for a corresponding threshold when deviation values for the eye candidate regions are calculated.

37. The method as claimed in claim 34, wherein, if only a pair of eyebrow candidate regions among the extracted isolated regions are detected, the detected pair of eyebrow candidate regions are set to eye candidate regions, and then an error rate for the eye candidate regions is calculated.

38. The method as claimed in claim 34, wherein, if only one eyebrow candidate region among the extracted isolated regions is detected, the detected eyebrow candidate region is set to an eye candidate region, a pair of eyes are created based on the eye candidate region, and then an error rate for the created pair of eyes is calculated.

39. An apparatus for creating a three-dimensional caricature based on a user's input facial image, comprising:

a memory unit for storing ASMs (Active Shape Models) required to create the three-dimensional caricature, and three-dimensional polygon face basic models that are based on anthropological standard data reflecting racial traits;

a pre-processing unit for detecting positions of eyes from the input facial image and normalizing the size of the facial image, the pre-processing unit calculating deviation values for eye candidate regions, calculating an error rate for the eye candidate regions by assigning a weight to each of the deviation values and summing the deviation values together, and determining whether the error rate for the eye candidate regions is within an allowable range;

a facial feature initial position-detecting unit for detecting each initial position for facial features from the normalized facial image;

an ASM loading unit for loading the ASMs stored in the memory unit in the normalized facial image so as to correspond to the detected initial position;

an ASM adapting unit for adapting the loaded ASMs so as to extract feature points for the facial features; and a caricature-creating unit for creating a three-dimensional polygon face caricature by loading the three-dimensional polygon face basic model from the memory unit and then modifying the loaded three-dimensional polygon face basic model according to coordinate values of the feature points extracted through the ASM adapting unit.

* * * * *